US011026077B2

(12) United States Patent
Stapleton

(10) Patent No.: US 11,026,077 B2
(45) Date of Patent: Jun. 1, 2021

(54) DISTRIBUTED ANTENNA SYSTEM NETWORK ANALYTICS

(71) Applicant: Dali Systems Co. Ltd., Grand Cayman (KY)

(72) Inventor: Shawn Patrick Stapleton, Vancouver (CA)

(73) Assignee: DALI SYSTEMS CO. LTD., George Town (KY)

( * ) Notice: Subject to any disclaimer, the term of this patent is extended or adjusted under 35 U.S.C. 154(b) by 0 days.

(21) Appl. No.: 15/203,015

(22) Filed: Jul. 6, 2016

(65) Prior Publication Data
US 2017/0013585 A1 Jan. 12, 2017

Related U.S. Application Data

(60) Provisional application No. 62/189,113, filed on Jul. 6, 2015.

(51) Int. Cl.
H04W 4/90 (2018.01)
H04W 88/08 (2009.01)
H04L 12/44 (2006.01)
H04L 12/42 (2006.01)
H04W 24/08 (2009.01)

(52) U.S. Cl.
CPC ............. *H04W 4/90* (2018.02); *H04L 12/42* (2013.01); *H04L 12/44* (2013.01); *H04W 24/08* (2013.01); *H04W 88/085* (2013.01)

(58) Field of Classification Search
CPC .......... G01S 5/0226; G01S 5/14; G01S 19/01; H04B 10/25755; H04B 10/25758; H04W 4/02; H04W 16/18; H04W 56/006; H04W 64/00; H04W 88/085
See application file for complete search history.

(56) References Cited

U.S. PATENT DOCUMENTS

| 2004/0096222 | A1  | 5/2004 | Cagenius et al. |
| 2005/0014518 | A1* | 1/2005 | Spain, Jr. ............. G01S 5/0252 455/456.5 |
| 2010/0190509 | A1  | 7/2010 | Davis et al. |

(Continued)

FOREIGN PATENT DOCUMENTS

| CN | 102282897 A   | 12/2011 |
| JP | 2016-502651 A | 1/2016  |

(Continued)

OTHER PUBLICATIONS

PCT/US2016/041076, "International Search Report and Written Opinion", dated Sep. 22, 2016, 10 pages.

(Continued)

*Primary Examiner* — Yuwen Pan
*Assistant Examiner* — Umair Ahsan
(74) *Attorney, Agent, or Firm* — Artegis Law Group, LLP

(57) ABSTRACT

The present disclosure generally relates to wireless communication systems employing Distributed Antenna Systems (DAS) as part of a distributed wireless network. More specifically, the present disclosure relates to a DAS network that utilizes traffic monitoring of mobile devices of a distributed wireless network. Traffic monitoring may be used to monitor the DAS network performance and generate analytics of individual mobile devices.

23 Claims, 17 Drawing Sheets

(56) References Cited

U.S. PATENT DOCUMENTS

| | | | |
|---|---|---|---|
| 2011/0028157 A1* | 2/2011 | Larsen | G01S 5/0226 |
| | | | 455/456.1 |
| 2013/0114486 A1* | 5/2013 | Spedaliere | H04W 84/10 |
| | | | 370/311 |
| 2014/0024402 A1 | 1/2014 | Singh et al. | |
| 2014/0120947 A1 | 5/2014 | Siomina | |
| 2014/0306841 A1 | 10/2014 | Stapleton | |
| 2016/0150432 A1* | 5/2016 | Qin | H04W 24/10 |
| | | | 370/252 |
| 2016/0371438 A1* | 12/2016 | Annulis | G06F 19/00 |
| | | | 455/456.1 |

FOREIGN PATENT DOCUMENTS

| | | |
|---|---|---|
| WO | WO 2010/083115 | 7/2010 |
| WO | WO 2014/022211 | 2/2014 |
| WO | WO 2014/064656 | 5/2014 |
| WO | WO 2014/123809 | 8/2014 |
| WO | 2015094051 A1 | 5/2015 |

OTHER PUBLICATIONS

Examination Report for AU Application No. 2016289947, dated Nov. 8, 2019, pp. all.

International Preliminary Report on Patentability for International Application No. PCT/US2016/041076, dated Jan. 18, 2018.

Extended European Search Report dated Mar. 4, 2019 for European Application No. 16821901.2, 8 pages, pp. all.

Lei, Yan-Ping et al. "Optimal Distribution for Four-Station TDOA Location System" 2010 3rd International Conference on Biomedical Engineering and Informatics (BMEI 2010); pp. 2858-2862; Oct. 16, 2010.

First Office Action (Including Translation) for Chinese Application No. 201680051423.3, dated May 6, 2020.

Office Action for European Patent Application No. 16821901.2, dated Feb. 19, 2020.

Office Action for Israel Patent Application No. 256721, dated Feb. 18, 2020.

Office Action (Including Translation) for Japanese Patent Application No. 2018-500520, dated Jun. 2, 2020.

Second Office Action (Including Translation) for Chinese Application No. 201680051423.3, dated Oct. 30, 2020.

Notice of Allowance (including Translation) for Israel Patent Application No. 256721, dated Sep. 10, 2020.

Decision to Grant (including Translation) for Japanese Patent Application No. 2018-500520, dated Oct. 20, 2020.

Notice of Acceptance for Australia Application No. 2016289947, dated Jul. 8, 2020.

Office Action for European Patent Application No. 16821901.2, dated Jul. 14, 2020.

Office Action (Including Translation) for Israel Patent Application No. 256721, dated Jul. 23, 2020.

Office Action (Including Translation) for Japanese Patent Application No. 2018-500520, dated Aug. 4, 2020.

\* cited by examiner

1010

- USER ID # 1123
  - Remote/Host ID # 35
    - Transmission Timestamp
    - Uplink/DownLink
    - No. Resource Blocks
    - Bit Map of Resource Blocks
    - Modulation Scheme
    - Acknowledgement
    - UE Channel
    - BS Channel
    - SNR / SINR
  - Remote/Host ID # 44
    - Transmission Timestamp
    - Uplink/DownLink
    - No. Resource Blocks
    - Bit Map of Resource Blocks
    - Modulation Scheme
    - Acknowledgement
    - UE Channel
    - BS Channel
    - SNR / SINR
  - Remote/Host ID # 54
    - Transmission Timestamp
    - Uplink/DownLink
    - No. Resource Blocks
    - Bit Map of Resource Blocks
    - Modulation Scheme
    - Acknowledgement
    - UE Channel
    - BS Channel
    - SNR / SINR
- USER ID # 1345
  - Remote/Host ID # 35
    - Transmission Timestamp
    - Uplink/DownLink
    - No. Resource Blocks
    - Bit Map of Resource Blocks
    - Modulation Scheme
    - Acknowledgement
    - UE Channel
    - BS Channel
    - SNR / SINR

*FIG. 10*

DISTRIBUTED ANTENNA SYSTEM NETWORK ANALYTICS

CROSS REFERENCE TO RELATED APPLICATIONS

This application claims priority to U.S. Provisional Patent Application No. 62/189,113, filed on Jul. 6, 2015, entitled "Distributed Antenna Network Analytics," the disclosure of which is hereby incorporated by reference in its entirety for all purposes.

BACKGROUND

Wireless network operators face a continuing challenge in building networks that effectively manage high data-traffic growth rates. To support the mobility and an increased level of multimedia content for end users, communication networks typically employ end-to-end network adaptations that support new services and the increased demand for broadband and flat-rate Internet access.

One of the most difficult challenges faced by network operators is determining the performance of a DAS network. Remote units used in a DAS network may have limited functionality and may not have the capability of a base station for extracting all Key Performance Indicators (KPIs) available for each user. These KPIs determine the quality of service provided to each user. Users' quality of service may inform network operators how to optimize their networks and may assist in determining problems as they arise. The separation of the base stations from remote units, which occurs in a DAS network, poses a problem in monitoring the network performance. In addition, identifying the location of a user in a DAS network—especially indoors—is a challenge.

SUMMARY

The present disclosure generally relates to wireless communication systems employing Distributed Antenna Systems (DAS) as part of a distributed wireless network. More specifically, the present disclosure relates to a DAS network that utilizes traffic monitoring of mobile devices of a distributed wireless network. Traffic monitoring may be used to monitor the DAS network performance and generate analytics of individual mobile devices.

According to one embodiment of the invention, a method for determining a geolocation of a mobile device in a DAS system is provided. The method comprises collecting first key performance indicator (KPI) data for the mobile device from a first digital remote unit (DRU). The first KPI data comprises at least one of a first power level and a first transmission time. The method further comprises obtaining a first location of the first DRU. The method further comprises collecting second KPI data for the mobile device from a second DRU. The second KPI data comprises at least one of a second power level and a second transmission time. The method further comprises obtaining a second location of the second DRU. The method further comprises collecting third KPI data for the mobile device from a third DRU. The third KPI data comprises at least one of a third power level and a third transmission time. The method further comprises obtaining a third location of the third DRU. The method further comprises determining the geolocation of the mobile device using (i) the first location and at least one of the first power level and the first transmission time, (ii) the second location and at least one of the second power level and the second transmission time, and (iii) the third location and at least one of the third power level and the third transmission time.

Systems for performing the methods described herein are also provided. The system comprises a server computer comprising a processor and memory storing instructions, executable by the processor, the instructions comprising the steps of the methods described herein. The system may further comprise a mobile device, at least one DRU, at least one digital access unit (DAU), and/or at least one base transceiver station (BTS).

These and other embodiments are described in further detail below.

BRIEF DESCRIPTION OF THE DRAWINGS

Further objects and advantages of the present invention can be more fully understood from the following detailed description taken in conjunction with the accompanying drawings in which:

FIG. 10 illustrates an example of KPI data 1010 that may be collected and stored for each user, as well as an example of the organization of that data;

DETAILED DESCRIPTION

Figure 1:
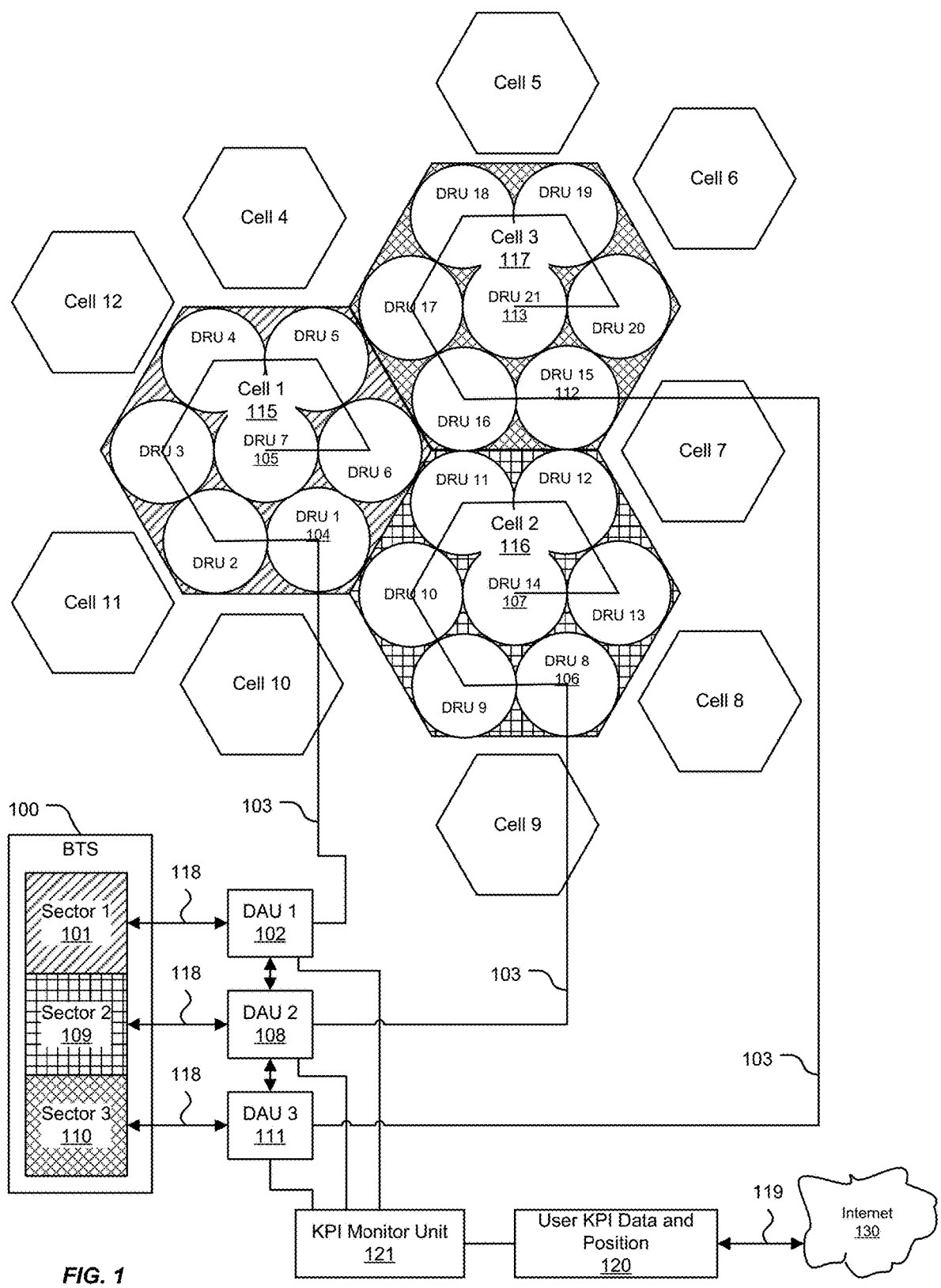
FIG. 1 illustrates an example of a basic DAS network architecture, and also illustrates an example of a data transport network, KPI traffic monitoring, use KPI data and position information storage.

A distributed antenna system (DAS) may efficiently utilize base station resources. The base station or base stations associated with a DAS may be located in a central location and/or facility, commonly known as a base station hotel. The DAS network may include one or more digital access units (DAUs, also referred to herein as host unit). DAUs function as an interface between the base stations and digital remote units (DRUs, also referred to herein as remote units). The DAUs can be collocated with the base stations. In some embodiments, the DAS network may further include one or more digital expansion units (DEUs) between the DAUs and the DRUs. DEUs provide routing between the DAUs and the DRUs. In some embodiments, the DEUs have a subset of the functionality of the DAUs, up to the full functionality of the DAUs. DRUs provide wireless network coverage for a given geographical area. The DRUs can be daisy chained together and/or placed in a star configuration. The DRUs may typically be connected with the DAUs using a high-speed optical fiber link. High-speed optical fiber links may facilitate transport of radio frequency (RF) signals from base stations, located at the base station hotel, to a remote location or area served by the DRUs. A base station may include a plurality of independent radio resources, commonly known as sectors. Each of these sectors may provide coverage to separate geographical areas. Each sector may be operable to avoid creating co-channel interference between users within each of the sectors.

A network's performance may be measured by the quality-of-service, or QoS, provided to each user. Quality-of-service may be expressed using Key Performance Indicators (KPIs). KPIs may be derived from different parts of the network. Different network operators may have different defined business goals and/or different services of interest. The requirements for obtaining efficient and cost effective network performance management may thus vary from operator to operator. Therefore, quality-of-service metrics may be defined and mapped to a set of KPIs, as required by each operator.

Remote units in a DAS network may not have the processing power of a base station, and thus may not be able to extract individual user KPIs. This creates a problem in determining the performance of a DAS network and further in identifying the position of mobile devices. Knowing the position of network users of mobile devices may be advantageous. For example, a user's position may be provided to an emergency service, such as the 911 emergency system. The user's position may also be used to obtain analytics about the mobile device. KPI metrics of individual mobile devices may also be used for monitoring the status of the DAS network, as well as optimizing the network in the event of failures.

In various implementations, the systems and methods disclosed herein may use time-stamped snapshots of the network traffic at the various remote units in the DAS network. These snapshots may be transported to hosts units. At the host units, the snapshots may be stored in a server for post processing. A traffic snapshot may consist of complex in-phase and quadrature data (often referred to as I/Q data) of various cellular bands provided by a network.

In some implementations, KPI data of the individual mobile devices may be scrambled and may be available only at a base station. As a result, KPI data may not be visible without access to proprietary encryption and/or decryption keys. The base station, however, may communicate with network mobile devices via control channels. These control channels may be readily available and provide limited information about KPIs. For example, downlink Long-Term Evolution (LTE) control channels and uplink LTE control channels may be composed of a Physical Broadcast Channel (PBCH), a Physical Downlink Control Channel (PDCCH), a Physical Downlink Shared Channel (PDSCH), a Physical Hybrid-Automatic Repeat Request (ARQ) Channel (PHICH), a Physical Uplink Control Channel (PUCCH), and a Physical Uplink Shared Channel (PUSCH). The control channels can provide information such as, for example, a transmission time, a power level, a user physical layer identifier, a number of allocated resource blocks, a bit-map of resource blocks, a modulation and coding scheme, an acknowledgement, a user channel, a base station channel, a signal-to-noise ratio (SNR), and/or a signal-to-interference-plus-noise ratio (SINR). Different telecommunication standards may provide different information that may be used as KPIs, and as standards evolve, additional KPI information may become available for use.

In some implementations, the systems and methods disclosed herein can be used in public safety communications systems. Such public safety communications systems may use the LTE control channels discussed above and/or APCO-25 control channels. Thus, in some implementations, APCO-25 control channels may be used alternatively or additionally to LTE or other cellular control channels.

As noted, KPI data from various remotes units and host units may be stored in a server for post processing. Control channel information for each network operator's channel may further be extracted from various signals. Furthermore, information associated with each mobile device may be tabulated.

The commissioning phase of a DAS system is when the DAS system is installed. The commissioning phase may determine the position of each of the remote units, in many cases fairly accurately. Knowing the position of the remote units may assist in establishing the location of individual mobile devices on the DAS network. In many cases, a mobile device's signal may be received by multiple remote units. Snapshots may be taken of each mobile device's KPI data at each remote unit. Because the snapshots at the various remote units are time synchronized and time-stamped, these multiple snapshots may be used to triangulate the user's position. There are many triangulation techniques available to locate a user's position, such as, for example, Time Delay of Arrival, Power Level, Time Difference, etc. In cases where triangulation may not provide a sufficiently accurate result, the position of the user may be estimated from the location of the remote antenna that received the user's signal at the highest power.

Floor plans of a venue that may be included in a DAS installation are generally available during the commissioning phase. These floor plans can be archived and used when tabulating KPI data. The remote units and host units of the DAS network can be identified with a position on the floor plans during the commissioning phase. The position of the remote units relative to a floor plan may further assist in quickly and accurately locating a user. This information may be advantageous, for example, to emergency responders.

FIG. 1 illustrates an example of a DAS network architecture according to one embodiment. Also illustrated is an example of a data transport network, KPI traffic monitoring, user KPI data and position information storage. The example of FIG. 1 illustrates a three-sector base station 100 (also referred to as a base transceiver station, or BTS), multiple DAUs 102, 108, 111 and multiple DRUs. In the illustrated example, the DRUs are connected in a daisy-chain configuration (meaning the DRUs are connected one after the other). In other implementations, the DRUs may be connected in a star configuration (meaning each DRU is independently connected to a central DAU). A daisy chain (or star) of DRUs may be referred to as a cell. Each cell provides network service coverage for a geographical area. The coverage area may be referred to as a sector. Each DRU may provide information associated with the DRU, which may uniquely identify uplink data received by the DRU.

In various implementations, the base station 100's resources may be shared among the DRUs, or among one or more groups of DRUs. To support this resource sharing, the DAUs 102, 108, 111 and/or DRUs may include routing tables. These routing tables may facilitate sharing of the base station 100's resources.

In various implementations, the DAUs 102, 108, 111 may be networked to each other to facilitate the routing of DRU signals among the multiple DAUs 102, 108, 111. The DAUs 102, 108, 111 may be configured to transport radio frequency downlink and radio frequency uplink signals between the base station 100 and the DRUs. The architecture of the example DAS network of FIG. 1 may enable various base station 100 signals to be transported to and from multiple DRUs. The DAUs may be interconnected using peer ports, that is, ports to connect the DAUs in a peer-to-peer network. A peer-to-peer network is distributed application architecture that partitions tasks or workloads between peer, or equally privileged, computing systems. Peer systems make a portion of their resources, such as processing power, disk storage or network bandwidth, directly available to other network participants, without the need for central coordination by servers or stable hosts. In some implementations, the DRUs may also be interconnected with peer ports.

In some implementations, the DAUs 102, 108, 111 may have the ability to control the gain, in small increments over a wide range, of downlink and uplink signals that may be transported between the DAUs 102, 108, 111 and the base station 100. This ability may allow the DAUs 102, 108, 111 to flexibly and/or simultaneously control uplink and downlink connectivity between any DRU, or a group of DRUs, and a particular base station 100 sector 101, 109, 110.

As noted above, routing tables may be used to configure the DAUs 102, 108, 111. Routing tables of the DAUs may establish mappings between inputs to the DAUs 102, 108, 111, and the DAUs' 102, 108, 111 various outputs. Merge blocks internal to the DAUs 102, 108, 111 may be used in conjunction with downlink tables when inputs from an external port and a peer port may be merged into the same data stream. Similarly, merge blocks may be used in conjunction with uplink tables when inputs from Local Area Network (LAN) ports and peer ports may be merged into the same data stream.

Routing tables at the DRUs may also be used establish mapping between inputs to the DRUs and the DRUs' various outputs. Merge blocks internal to the DRUs may be used in conjunction with downlink tables when inputs from LAN ports and peer ports are to be merged into the same data stream. Similarly, merge blocks may be used in conjunction with uplink tables when the inputs from external ports and peer ports are to be merged into the same data stream.

In the illustrated example of FIG. 1, the base station 100 includes three sectors, Sector 1 101, Sector 2 109, and Sector 3 110. In the illustrated example, each sector 101, 109, 110's radio resources may be a transported to a daisy-chained network of DRUs. Each sector 101, 109, 110's radio resources may provide network service coverage to an independent geographical area, via the network DRUs. In the example of FIG. 1, three cells 115, 116, 117, each comprising seven DRUs, provide coverage to a given geographical area. A server (not illustrated) may control switching of signals between the base station 100, DAUs 102, 108, 111, and the cells 115, 116, 117.

In the illustrated example of FIG. 1, DAU 1 102 receives downlink signals from Sector 1 101 of the base station 100. The downlink signals may be received as radio frequency signals 118. DAU 1 102 may translate the radio frequency downlink signals 118 from Sector 1 101 to optical signals. DAU 1 102 may further transport some or all of the downlink signals to DRU 1 104 in Cell 1 115, using optical fiber cable 103. The signals may be transported over additional optical fiber cable between the DRUs in Cell 1 115, through each DRU in Cell 1 115, to DRU 7 105, the last DRU in the chain. In a similar fashion, DAU 2 108 may receive radio frequency downlink signals 118 from Sector 2 109 of the base station 100. DAU 2 108 may translate the downlink signals to optical signal, and transport some or all of these downlink signals, using an optical cable 103 to DRU 8 106 in Cell 2 116. The downlink signals may further be transported through each DRU in Cell 2 116 to DRU 14 107, the last DRU in this chain. Similarly, DAU 3 111 may transport downlink signals from Sector 3 110 to DRU 15 112 in Cell 3 113. The downlinks signals may further be transported through each DRU in Cell 3 117 to DRU 21 113, the last DRU in this chain. Additional cells may be provided and connected to the DAS network. In some implementations, the DAUs 102, 108, 111 may interface with the base station 100 via a digital data link. In such implementations, radio frequency translation at the DAUs 102, 108, 111 may not be necessary.

In the illustrated example, DAU 1 102 is networked with DAU 2 108 and DAU 3 111. Networking the DAUs 102, 108, 111 allows the downlink signals from Sector 2 109 and Sector 3 110 to be transported to the DRUs in Cell 1 115. Similarly, downlink signals from Sector 1 201 may be transported to the DRUs in Cell 2 116 and Cell 3 217. Switching and routing functionality may control which sectors' 101, 109, 110 signals are transmitted and/or received by each DRU in Cell 1 115.

In some implementations, one or more digital expansion units (DEUs) (not shown) are present between the DAUs 102, 108, 111 and their associated DRUs 104, 105, 106, 107, 112, 113. The DEUs may provide routing between the DAUs 102, 108, 111 and their associated DRUs 104, 105, 106, 107, 112, 113. In some embodiments, the DEUs have a subset of the functionality of the DAUs 102, 108, 111, up to the full functionality of the DAUs 102, 108, 111.

Also illustrated in FIG. 1 is, by way of example, a KPI traffic monitoring unit 121 and user KPI data and position storage 120. The DAUs 102, 108, 111 may each be connected to the KPI traffic monitoring unit 121. Alternatively, the KPI traffic monitoring unit 121 may be inside a particular DAU (e.g., DAU 102), or each DAU (e.g., DAUs 102, 108, 111) may be equipped with a KPI traffic monitoring unit 121. The KPI traffic monitoring unit 121 may track user KPIs at each DAU 102, 108, 111 and DRU in the network. Time-synchronized snapshots of the traffic at the various DRUs and/or DAUs 102, 108, 111 may be collected and stored in a server for post processing. The traffic snapshots may include complex I/Q data from various cellular bands provided by the DAS network. The traffic snapshots may be collected and stored in the KPI Data and Position unit 120. As with the KPI traffic monitoring unit 121, the KPI Data and Position unit 120 may be separate from or a part of the DAUs (e.g., DAUs 102, 108, 111). The User KPI Data and Position unit 120 may extract KPI data for each user associated with the DAUs 102, 108, 111 and DRUs. This data may be extracted from control channels provided with uplink and downlink signals.

Control channels may be readily available. Control channels may provide limited information about user KPIs. For example, downlink LTE channels and uplink LTE control channels may include a Physical Broadcast Channel (PBCH), a Physical Downlink Control Channel (PDCCH), a Physical Downlink Shared Channel (PDSCH), a Physical Hybrid-ARQ Channel (PHICH), a Physical Uplink Control Channel (PUCCH), and a Physical Uplink Shared Channel (PUSCH). Control channels may provide information such as for example transmission time, power level, user physical layer identifiers, a number of allocated resource blocks, a bitmap of resource blocks, a modulation and coding scheme, acknowledgements, a user channel, a base station channel, SNR, and/or SINR.

The snapshots at the various DRUs may be time synchronized and time-stamped. These snapshots may be used to triangulate the user's position. Many triangulation techniques are available to locate a user's position, such as, for example, Time Delay of Arrival, Power Level, Time Difference at Arrival, etc. A time synchronized DAS network may provide the added advantage of relatively accurate time-stamped snapshots from a multitude of remote units and host units. In cases where triangulation may not provide a sufficiently accurate result, the position of user may be estimated from the location of the remote unit that received the highest signal power. User data may be provided over an Internet Protocol (IP) 119 connection to the Internet 130, so that the data may be accessible for example on the World Wide Web.

Figure 2:
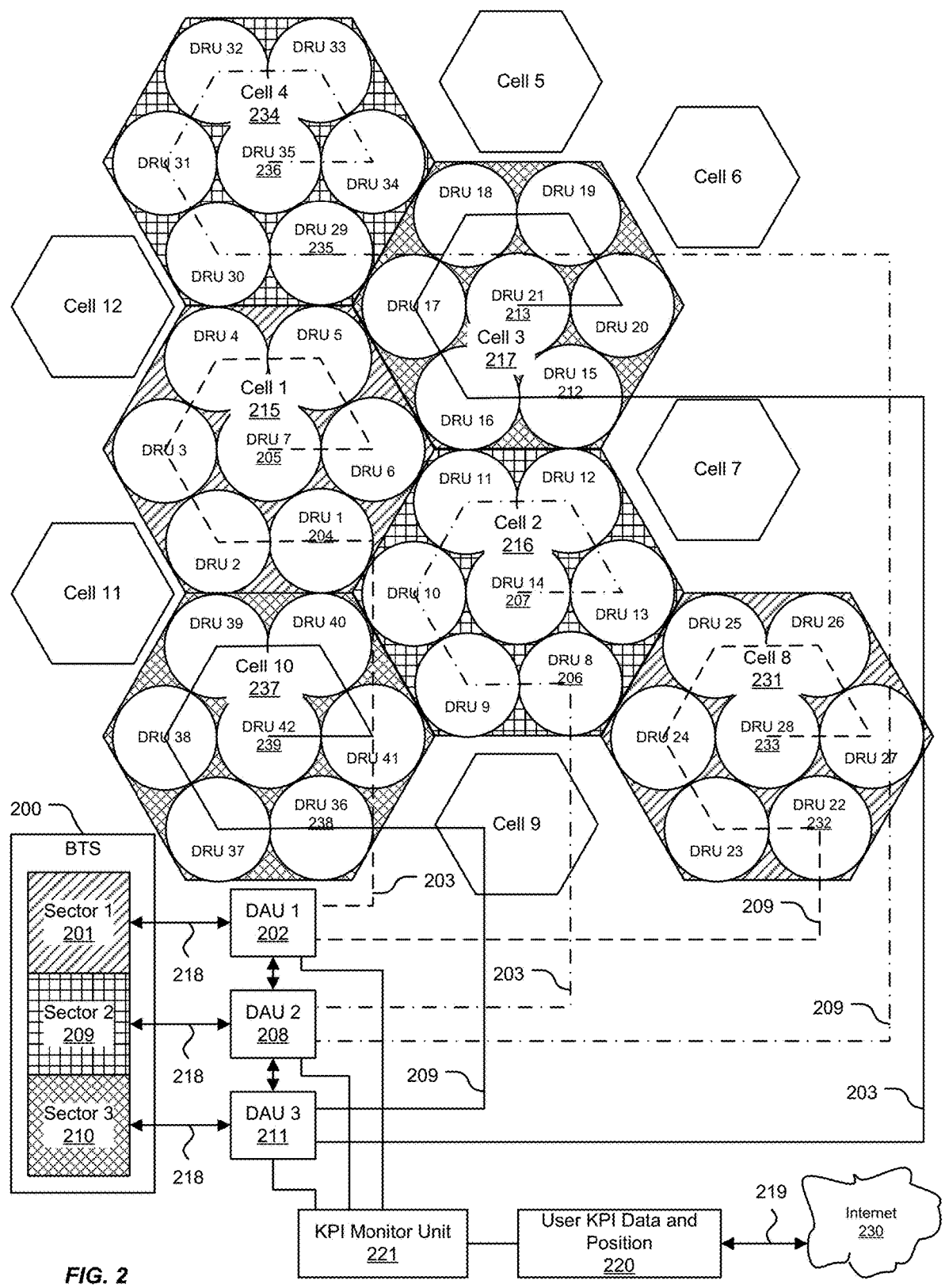
FIG. 2 illustrates another example of DAS network architecture, in which a single base station is used to provide network coverage for a large geographic area when a frequency reuse pattern of N=1 is used.

FIG. 2 illustrates another example of DAS network architecture, in which a single base station is used to provide network coverage for a large geographic area when a frequency reuse pattern of N=1 is used. The example of FIG. 2 illustrates a three-sector base station 200, multiple DAUs 202, 208, 211, and multiple DRUs. The DRUs in this example are grouped into six cells 215, 216, 217, 231, 234, 237. Within each cell, the DRUs are connected in daisy chained configuration. In this example, Cell 1 215 and Cell 8 share the radio resources of Sector 1 201 of the base station 100. Similarly, Cell 2 216 and Cell 3 217 share the radio resources of Sector 2 209 of the base station 100. Also similarly, Cell 3 217 and Cell 10 237 share the radio resources of Sector 3 210.

The DAUs 202, 208, 211 may control routing of data between the base station 100 and the DRUs. A data packet may be provided with a header that identifies the DRU with which it is associated. The DAUs 202, 208, 211 may be interconnected to allow data to be transported between them. The ability to route data between the DAUs 202, 208, 211 may be advantageous, because this allows flexible routing of signals between any of the sectors 201, 209, 210 and the individual DRUs. A server (not illustrated) may provide switching and routing functions.

In the illustrated example of FIG. 2, DAU 1 202 receives downlink signals from Sector 1 201 of the base station 200. DAU 1 202 may translate radiofrequency signals 218 from Sector 1 201 to optical signals. DAU 1 202 may further transport some or all of the downlink signals to DRU 1 204 in Cell 1 215, using optical fiber cable 203. The signal may be transported through additional optical fiber cable between the DRUs in Cell 1 115, through each DRU in Cell 1 215 to DRU 7 205, the last DRU in the chain. In the illustrated example, DAU 1 202 may also transport downlink signals to DRU 212 in Cell 3 217 over an additional optical cable 209.

The signals may further be transported over additional optical cable through each DRU in Cell 3 217 to DRU 21 213, the last DRU in Cell 3 217. Cell 3 217 may provide network service coverage to a different geographical area than is provided by Cell 1 215. In this way, the services provided by Sector 1 201 may be distributed to a larger area. In some cases, Cell 3 217 may be a great distance away from Cell 1 215. In other cases, Cell 3 217 and Cell 1 215 may be adjacent and/or coverage provided by them may be partially overlapping.

In a similar fashion, DAU 2 208 may receive radio frequency downlink signals 218 from Sector 2 209 of the base station 200. DAU 2 208 may translate the downlink signals to optical signals, and transport some or all of these downlink signals, using an optical cable 203 to DRU 8 206 in Cell 2 216. The downlink signals may further be transported through each DRU in Cell 2 216 to DRU 14 207, the last DRU in this chain. In this example, DAU 2 208 may also transport downlink signals to DRU 29 235 in Cell 4 234 over an additional optical cable 209. The signals may further be transported through each DRU in Cell 4 234 to DRU 35 236, the last DRU in this chain. Cell 4 234 may provide network service coverage to a different geographical area than is provided by Cell 2 216. Furthermore, DAU 2 208 may selectively transport signals to either Cell 2 216 or Cell 4 234, or both. In this way, network service coverage may be provided as needed in the geographical area covered by each cell 216, 234.

Similarly, DAU 3 111 may transport downlink signals from Sector 3 110 to DRU 15 112 in Cell 3 113. The downlink signals may further be transported through each DRU in Cell 3 117 to DRU 21 113, the last DRU in this chain. DAU 3 111 may also transport downlink signals, via an additional optical cable 209, to DRU 42 239 in Cell 10 237. The signals may further be transported through each DRU in Cell 10 237 to DRU 42 239, the last DRU in this chain.

Additional cells may be provided and connected to the DAS network. In some implementations, the DAUs 102, 108, 111 may interface with the base station 100 via a digital data link. In such implementations, radiofrequency translation at the DAUs 102, 108, 111 may not be necessary.

In some implementations, DAU 1 202, DAU 2 208, and DAU 3 2111 may be networked to each other. In these implementations, downlink signals from Sector 2 209 and Sector 3 210 may be transported to some or all of the DRUs in Cell 1 215 and/or Cell 4 234. Similarly, downlink signals from Sector 1 201 may transported to Cell 2 216 and/or Cell 4 234 by way of DAU 2 208, and Cell 3 217 and/or Cell 10 237 by way of DAU 3 211.

In some implementations, one or more digital expansion units (DEUs) (not shown) are present between the DAUs 202, 208, 211 and their associated DRUs 204, 205, 206, 207, 212, 213, 232, 233, 235, 236, 238, 239. The DEUs may provide routing between the DAUs 202, 208, 211 and their associated DRUs 204, 205, 206, 207, 212, 213, 232, 233, 235, 236, 238, 239. In some embodiments, the DEUs have a subset of the functionality of the DAUs 202, 208, 211, up to the full functionality of the DAUs 202, 208, 211.

Also illustrated in FIG. 2 is, by way of example, a KPI monitor unit 221 and User KPI Data and Position storage 220. The DAUs 202, 208, 211 may each be connected to the KPI monitor unit 221. Alternatively, the KPI monitor unit 221 may be inside a particular DAU (e.g., DAU 202), or each DAU (e.g., DAUs 202, 208, 211) may be equipped with a KPI monitor unit 221. The KPI monitor unit 221 may track user KPIs at each DAU 202, 208, 211 and/or DRU in the network. The KPI monitor unit 221 may collect time-synchronized snapshots of user data at any of the DAUs 202, 208, 211 and/or DRUs. The User KPI Data and Position storage 220 (which may be separate from or a part of one or more of DAUs 202, 208, 211) may extract KPI data from control channels provided in the user communication links. The User KPI Data and Positioning storage 220 may further use triangulation methods to determine a user's positon relative to the positon of the DRUs. User KPI data and/or position may be made provided over an IP 219 connection to the Internet 230, so that the data may be accessible for example on the World Wide Web.

Figure 3:
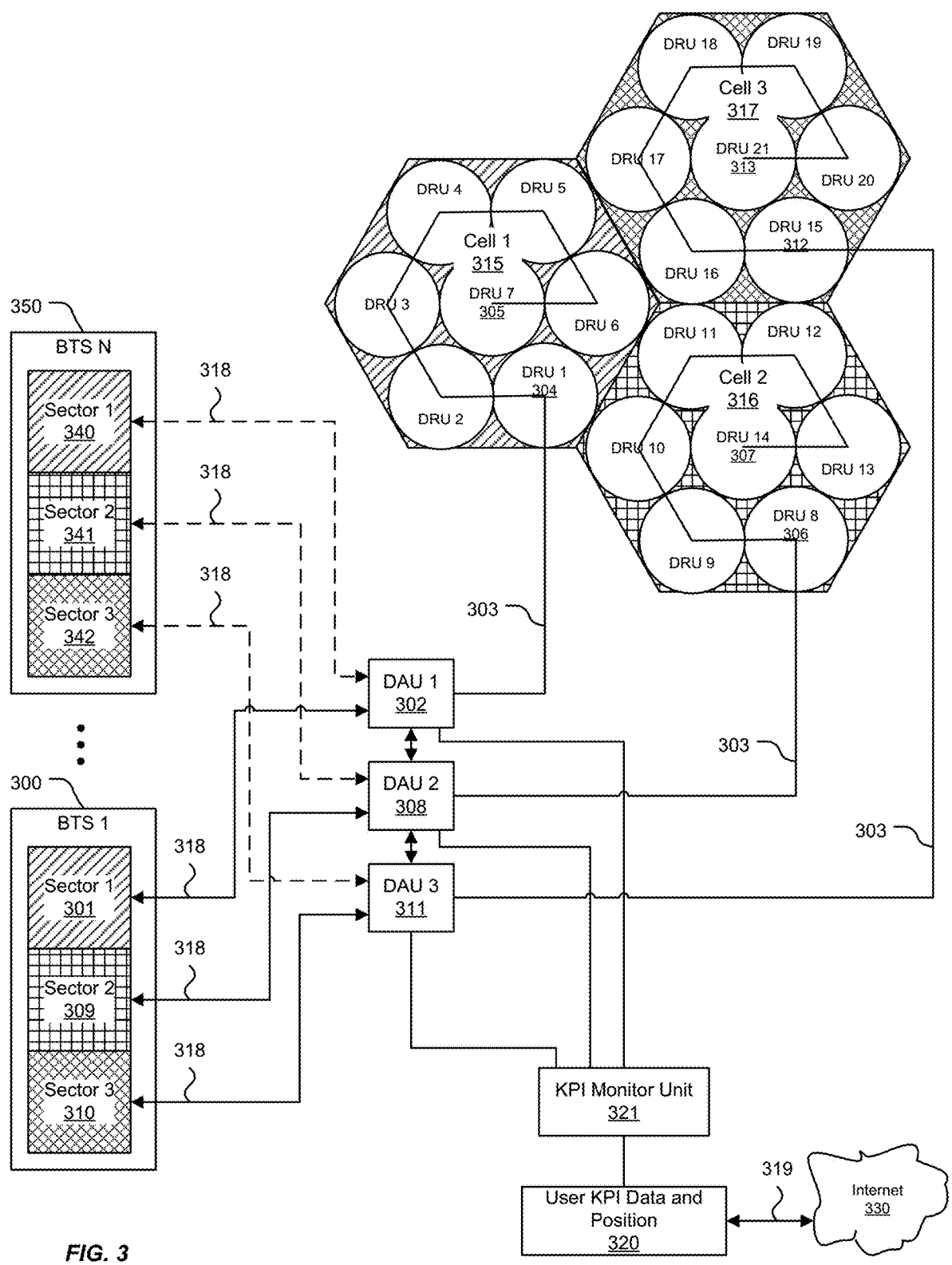
FIG. 3 illustrates an example of a DAS network architecture that includes a base station hotel with multiple base stations.

FIG. 3 illustrates an example of a DAS network architecture that includes a base station hotel with multiple base stations 300, 350. The number of base stations at the base station hotel may be represented as N base stations. Each base station 300, 350 may represent an independent wireless network operator. Alternatively or additionally, each base station 300, 350 may implement a different wireless standard (e.g. Wideband Code Division Multiple Access (WCDMA), LTE, etc.). Alternatively or additionally, each base station 300, 350 may provide additional radiofrequency carriers. Base station 300, 350 signals may be combined prior to these signals being transported to a DAU, as may be the case for a Neutral Host application.

In the illustrated example of FIG. 3, DAU 1 302 receives downlink signals from Sector 1 301 of the base station 300. The downlink signals may be received as radio frequency signals. 318. DAU 1 302 may translate the radio frequency downlink signals 318 from Sector 1 301 to optical signals. DAU 1 302 may further transport some or all of the downlink signals to DRU 1 304 in Cell 1 315, using optical fiber cable 303. The signals may be transported over additional optical fiber cable between the DRUs in Cell 1 315, through each DRU in Cell 1 315, to DRU 7 305, the last DRU in the chain. DAU 1 302 may also receive downlink signals from Sector 1 340 of base station N 350. The downlink signals from base station N 350 may also be received as radiofrequency signals 318. DAU 1 302 may also translate the downlink signals from Sector 1 340 of base station N 350 to optical signals, for transport to the DRUs in Cell 1 315.

In a similar fashion, DAU 2 308 may receive radio frequency downlink signals 318 from Sector 2 109 of the base station 300, and Sector 2 341 of base station 350. DAU 2 308 may translate the downlink signals to optical signals, and transport some or all of these downlink signals, using an optical cable 303 to DRU 8 306 in Cell 2 316. The downlink signals may further be transported through each DRU in Cell 2 316 to DRU 14 307, the last DRU in this chain. Similarly, DAU 3 111 may transport downlink signals from Sector 3 110 of base station 300 and Sector 3 342 of base station N 350 to DRU 15 312 in Cell 3 313. The downlink signals may further be transported through each DRU in Cell 3 317 to DRU 21 313, the last DRU in this chain.

In some implementations, DAU 1 302 may be networked with DAU 2 308 and DAU 3 311. Networking the DAUs 302, 308, 311 allows the downlink signals from Sectors 2 309 and Sector 3 310 from base station 300, and Sector 2 341 and Sector 3 342 from base station N 350, to be transported to some or all of the DRUs in Cell 1 315. Similarly, downlink signals from Sector 1 301 of base station 300 and Sector 1 340 of base station 350 may be transported to some or all of the DRUs in Cell 2 316 and Cell 3 317.

In some implementations, the DAS network architecture of FIG. 3 may achieve more efficient usage of base station resources. Routing functionality in the DAUs may be configured to redirect uplink and downlink signals associated with unique data streams to and from any of the base station 300, 350 sectors to and from any of the DRUs.

In some implementations, one or more digital expansion units (DEUs) (not shown) are present between the DAUs 302, 308, 311 and their associated DRUs 304, 305, 306, 307, 312, 313. The DEUs may provide routing between the DAUs 302, 308, 311 and their associated DRUs 304, 305, 306, 307, 312, 313. In some embodiments, the DEUs have a subset of the functionality of the DAUs 302, 308, 311, up to the full functionality of the DAUs 302, 308, 311.

Figure 4:
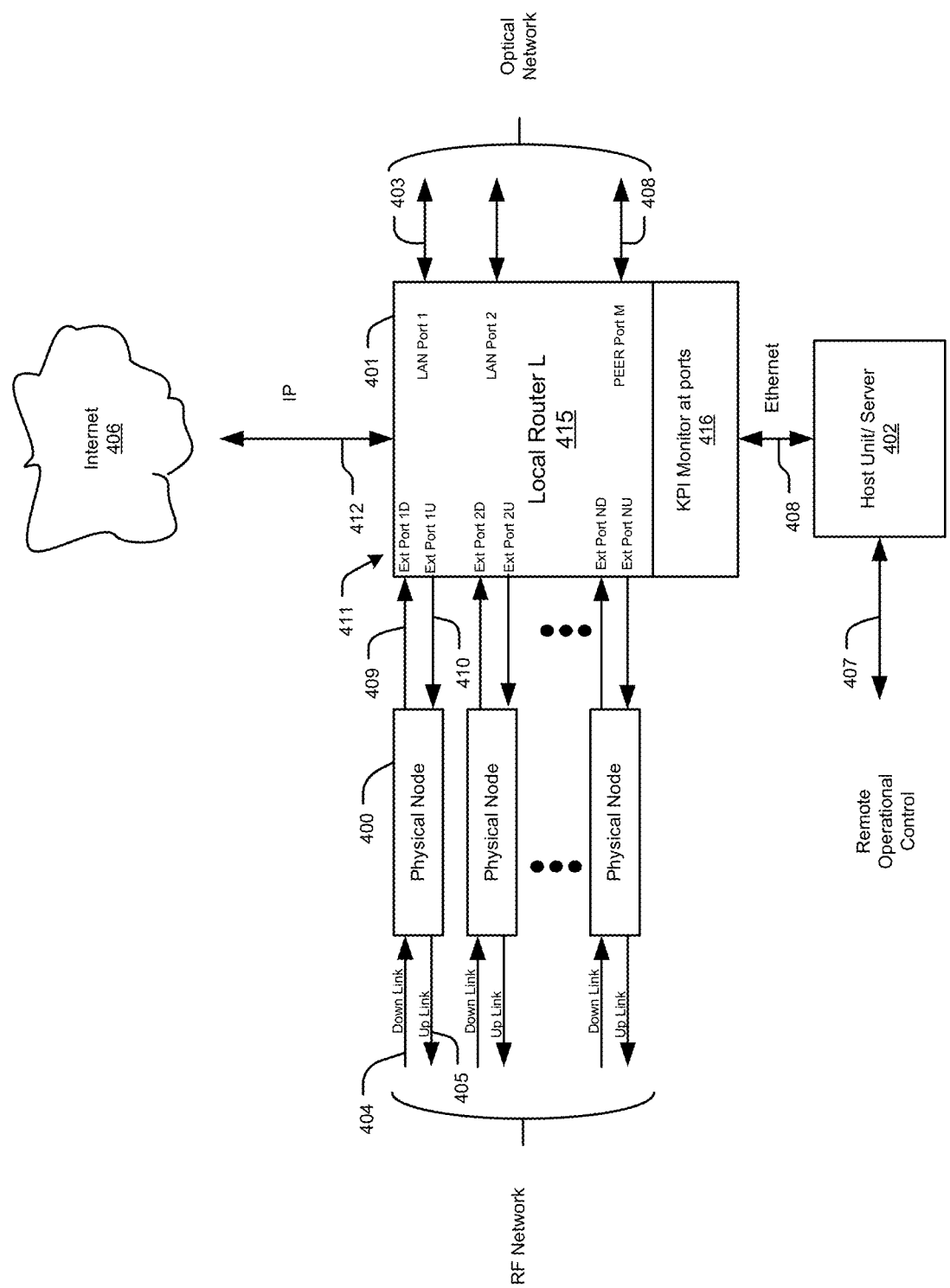
FIG. 4 illustrates an example of the elements of a DAU, according to one embodiment.

FIG. 4 illustrates an example of the elements of a DAU, according to one embodiment. In this example, the DAU is composed of physical nodes 400 and a local router 401. The physical nodes 400 may translate radio frequency downlink signals 404 to baseband downlink signals 409, and baseband uplink signals 410 to radiofrequency uplink signals 405. The physical nodes 400 may connect to one or more base stations at radio frequencies. Each physical node 400 may be used by a different network operator, for different frequency bands, for different channels, or any combination of operator, band and/or channel. In some implementations, the physical nodes 400 may combine downlink 404 and uplink 405 signals via a duplexer. In other implementations, the physical nodes 400 may keep downlink 404 and uplink 405 signals separate, such as, for example, for a simplex configuration.

The local router 401 may direct traffic data between various LAN ports 403, peer ports 408, and external ports 411. In some implementations, the local router 401 may also include (or alternatively, be coupled to) a KPI monitor 416. The KPI monitor 416 may obtain time-synchronized snapshots of traffic data at each of the DAU ports.

As illustrated in the example of FIG. 4, the physical nodes 400 have separate outputs for the uplink signals 405 and separate inputs for the downlink signals 404. Each physical node 400 may be configured to translate the signals from radio frequency to baseband and vice versa. The physical nodes 400 may be connected to external ports 409, 410 on the local router 401. The local router 401 may be configured to directed uplink data streams from the LAN 403 and peer 408 ports to external U ports 410. Similarly, the local router 401 may be direct downlink data streams from the external D ports 409 to LAN 403 and peer 408 ports.

In some implementations, the LAN ports 403 and peer ports 408 may be connected via optical fiber cable to a network of other DAUs and DRUs. Alternatively or additionally, a connection to this network connection may use copper interconnections, such as, for example, category-5 (cat-5) or category-6 (cat-6) cabling, or other suitable interconnection equipment. The DAU of FIG. 4 may also be connected to the Internet 406 IP 412 capable connection. The DAU may also include an Ethernet connection 408 to communicate with a host unit or server 402. The DAU may communicate with a remote operation control 407 center through the host unit 402. In some implementations, the DAU may connect directly to the remote operational control 407 through the Ethernet port 408.

Figure 5:
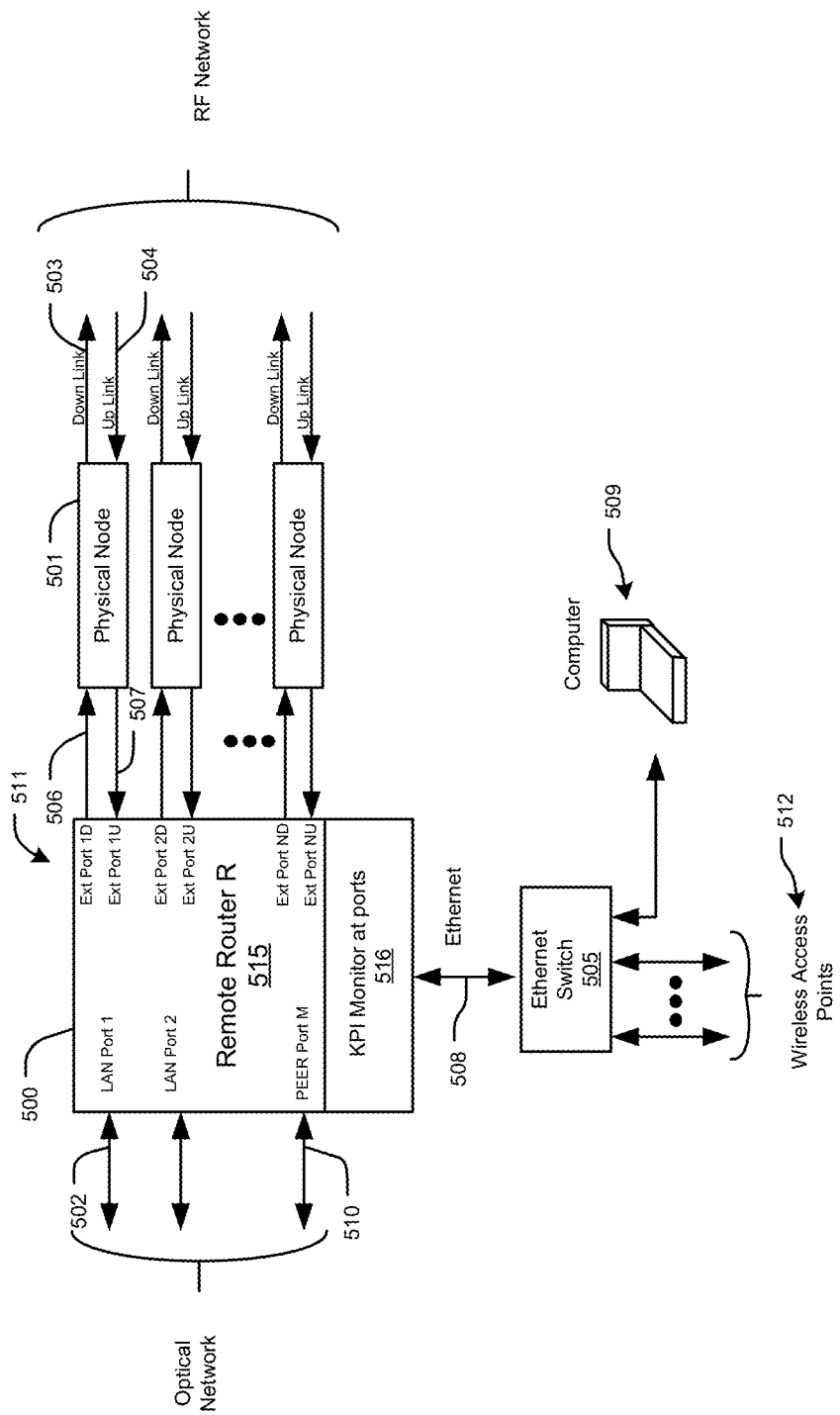
FIG. 5 illustrates an example of the elements of a DRU, according to one embodiment.

FIG. 5 illustrates an example of the elements of a DRU, according to one embodiment. In this example, the DRU is composed of physical nodes 501 and a remote router 500. The remote router 500 may be configured to direct traffic data between LAN ports 502, external ports 511, and peer ports 510.

The physical nodes 501 may connect to a base station and/or antenna network at radio frequencies. Each physical node 501 may be used by different network operators, for different frequency bands, for different channels, or for any combination of operators, bands, and/or channels. In the illustrated example of FIG. 5, the physical ports 501 have separate inputs for uplink signals 504 and downlink signals 503. The physical ports 501 may translate radiofrequency uplink signals 504 to baseband signals 507, and baseband downlink 506 to radiofrequency downlink signals 503. The physical ports 501 may be connected to the external ports 511 on the remote router 500.

The remote router 500 may be configured to direct downlink data streams from the LAN 502 and peer 510 ports to the External D ports 506. Similarly, the remote router 500 may direct uplink data streams from the External U ports 507 to LAN 502 and peer 510 ports. The DRU may also include an Ethernet switch 505. The Ethernet switch 505 may allow a remote computer 509 or one or more wireless access points 512 to connect to the Internet, by way of the DRU. In some implementations, the remote router 500 may also include (or alternatively, be coupled to) a KPI monitor 516. The KPI monitor 516 may be configured to obtain time-synchronized snapshots of traffic data at each of the DRU's ports.

Figure 6:
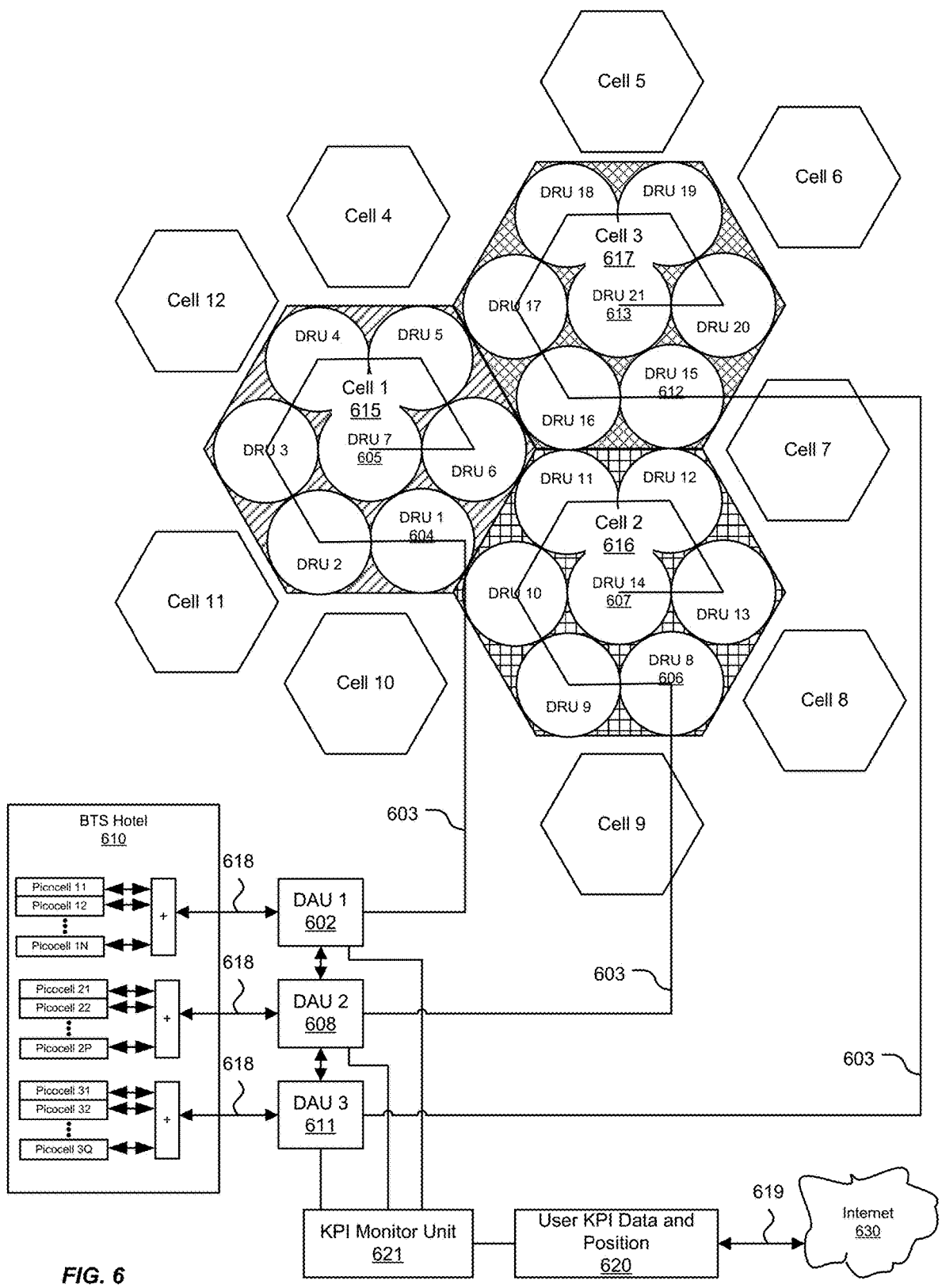
FIG. 6 illustrates an example of a DAS network architecture, and further illustrates in greater detail an example of a base station hotel.

FIG. 6 illustrates an example of a DAS network architecture, and further illustrates in greater detail an example of a base station hotel 610. A base station hotel 610 may be composed of multiple picocells. Picocells may in most cases be wireless network operator dependent and/or frequency band dependent. In some implementations, picocells may be referred to as small cells. Picocells that operate in the same frequency band may be combined in the radio frequency domain, and the combined signal may be transported via a radio frequency connection 618 to a DAU 602, 608, 611. Each DAU 602, 608, 611 may translate the combined signal to an optical signal, and transport the optical signal via an optical cable 603 to a daisy-chained cell 615, 616, 617 of DRUs. For example, the picocells numbered 11, 12, . . . 1N may be combined and transported to DAU 1 602. DAU 1 602 may transport the signal over an optical cable 603 to the DRUs in Cell 1 615. In this way, the DAUs 602, 608, 611, and the DAUs' 602, 608, 611 corresponding cells 615, 616, 617 of DRUs, may each provide network service coverage to a different geographical area.

In some implementations, one or more digital expansion units (DEUs) (not shown) are present between the DAUs 602, 608, 611 and their associated DRUs 604, 605, 606, 607, 612, 613. The DEUs may provide routing between the DAUs 602, 608, 611 and their associated DRUs 604, 605, 606, 607, 612, 613. In some embodiments, the DEUs have a subset of the functionality of the DAUs 602, 608, 611, up to the full functionality of the DAUs 602, 608, 611.

In some implementations, the DAS network architecture of FIG. 6 may include a KPI monitor unit 621 and user KPI data and position storage 622. The KPI monitor unit 621 may be connected to each of the DAUs 602, 608, 611. Alternatively, the KPI monitor unit 621 may be inside a particular DAU (e.g., DAU 611), or each DAU (e.g., DAUs 602, 608, 611) may be equipped with a KPI monitor unit 621. The KPI monitor unit 621 may capture time-stamped snapshots of user traffic data at each of the DAUs 602, 608, 611 and DRUs. User KPI data and position storage 622 (which may be separate from or a part of one or more of the DAUs 602, 608, 611) may store the snapshots, and may further use the snapshot data to determine the user's position. User KPI data and position information may be provided over an IP 619 connection to the Internet 630, so that the data may be accessible for example on the World Wide Web.

Figure 7:
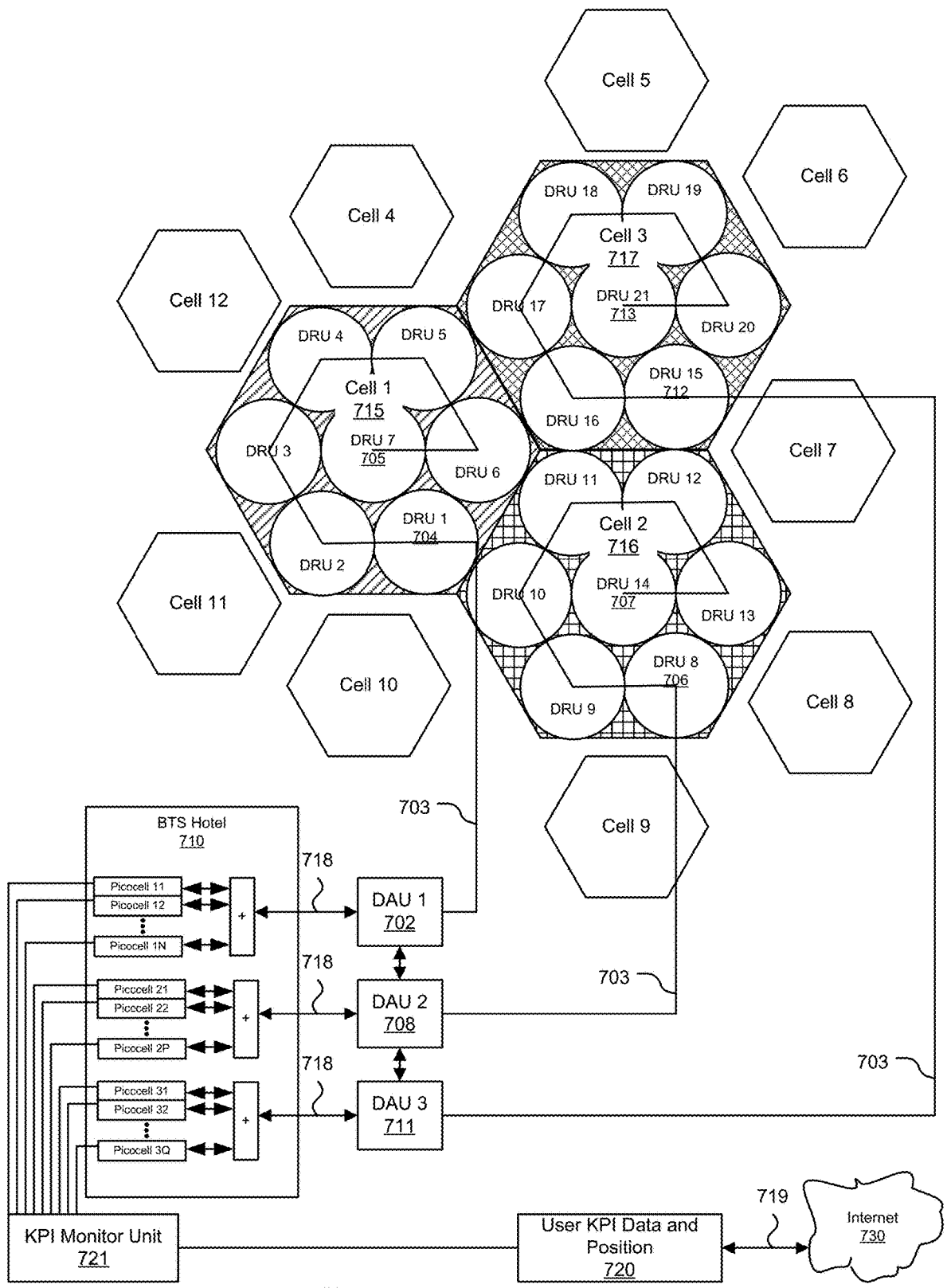
FIG. 7 illustrates another example of a DAS network architecture, and further illustrates in greater detail an example of a base station hotel.

FIG. 7 illustrates another example of a DAS network architecture, and further illustrates in greater detail an example of a base station hotel 710. A base station hotel 710 may be composed of multiple picocells. Picocells may in most cases be wireless network operator dependent and/or frequency band dependent. Picocells that operate in the same frequency band may be combined in the radio frequency domain, and the combined signal may be transported via a radio frequency connection 718 to a DAU 702, 708, 711. Each DAU 702, 708, 711 may translate the combined signal to an optical signal, and transport the optical signal via an optical cable 703 to a daisy-chained cell 715, 716, 717 of DRUs. The DAUs 702, 708, 711, and the DAUs' 702, 708, 711 corresponding cells 715, 716, 717 of DRUs, may each provide network service coverage to a different geographical area.

In some implementations, one or more digital expansion units (DEUs) (not shown) are present between the DAUs 702, 708, 711 and their associated DRUs 704, 705, 706, 707, 712, 713. The DEUs may provide routing between the DAUs 702, 708, 711 and their associated DRUs 704, 705, 706, 707, 712, 713. In some embodiments, the DEUs have a subset of the functionality of the DAUs 702, 708, 711, up to the full functionality of the DAUs 702, 708, 711.

In some implementations, the DAS network architecture of FIG. 7 may include a KPI monitor unit 721 and user KPI data and position storage 722. The KPI monitor unit 721 may be connected to the picocells 741, 742, 743. The KPI monitor unit 721 may capture time-stamped snapshots of user traffic data transmitted and received by each picocell 741, 742, 743. User KPI data and position storage 722 may store the snapshots, and may further use the snapshot data to determine the user's position. User KPI data and position may be provided over an IP 719 connection to the Internet 730, so that the data may be accessible for example on the World Wide Web.

Figure 8:
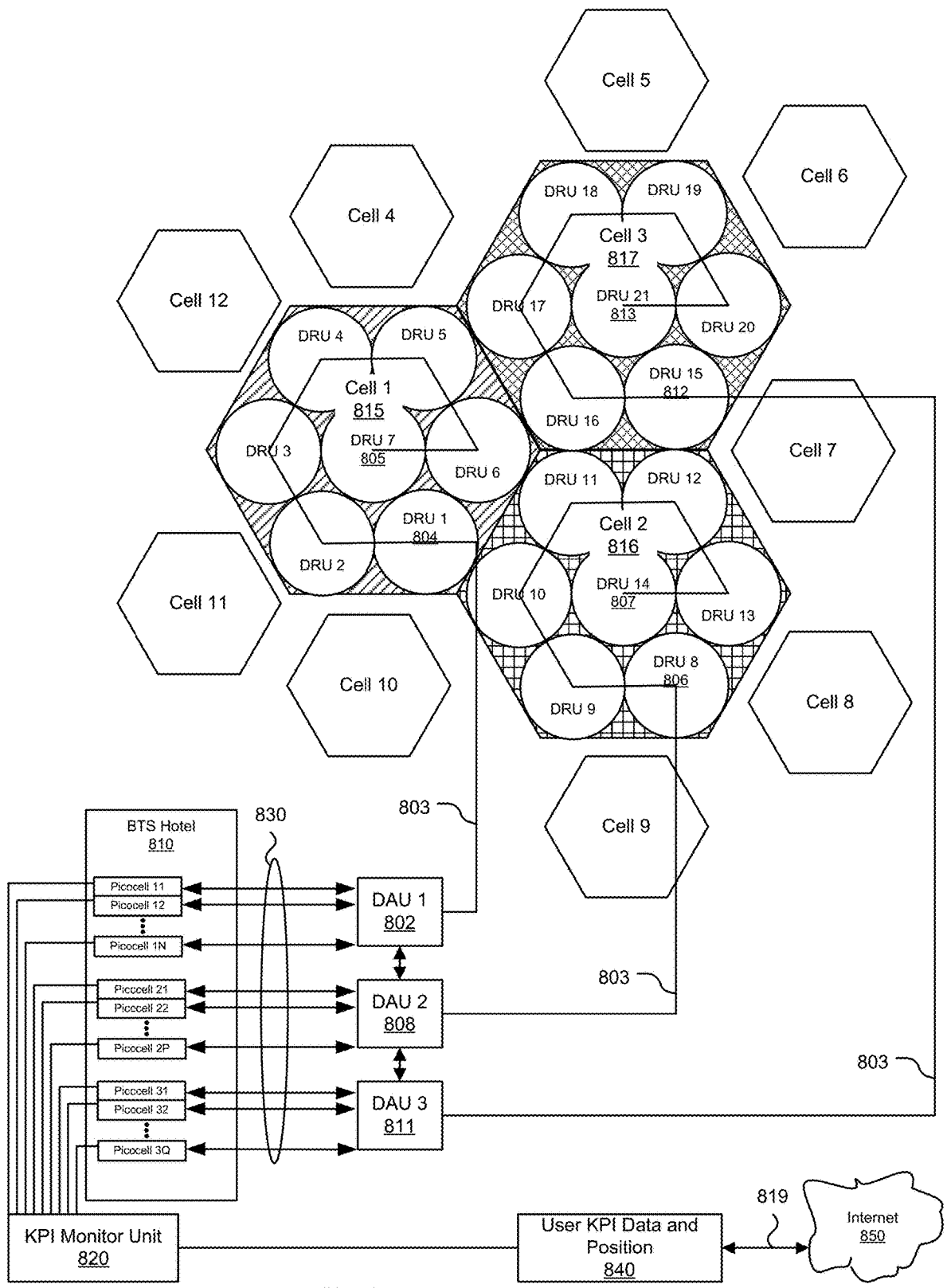
FIG. 8 illustrates another embodiment of a DAS network architecture that includes a base station hotel.

FIG. 8 illustrates another embodiment of a DAS network architecture that includes a base station hotel 810. The base station hotel 810 may be composed of multiple picocells. Picocells may in most cases be wireless network operator dependent and/or frequency band dependent. In some implementations, the picocells may include a digital interface. In these implementations, the picocells may be connected to the DAUs 802, 808, 811 via a digital connection 830, such as for an example an optical fiber cable. Each DAU 802, 808, 811 transports an optical signal via an optical cable 803 to a daisy-chained cell 815, 816, 817 of DRUs. The DAUs 802, 808, 811, and the DAUs' 802, 808, 811 corresponding cells 815, 816, 817 of DRUs, may each provide network service coverage to a different geographical area.

In some implementations, one or more digital expansion units (DEUs) (not shown) are present between the DAUs 802, 808, 811 and their associated DRUs 804, 805, 806, 807, 812, 813. The DEUs may provide routing between the DAUs 802, 808, 811 and their associated DRUs 804, 805, 806, 807, 812, 813. In some embodiments, the DEUs have a subset of the functionality of the DAUs 802, 808, 811, up to the full functionality of the DAUs 702, 708, 711.

In some implementations, the DAS network architecture of FIG. 8 may include a KPI monitor unit 820 and user KPI data and position storage 840. The KPI monitor unit 820 may be connected to the picocells. The KPI monitor unit 820 may capture time-stamped snapshots of user traffic data transmitted and received by each picocell. User KPI data and position storage 840 may store the snapshots, and may further use the snapshot data to determine the user's position. User KPI data and position may be provided over an IP 819 connection to the Internet 850, so that the data may be accessible for example on the World Wide Web.

Figure 9:
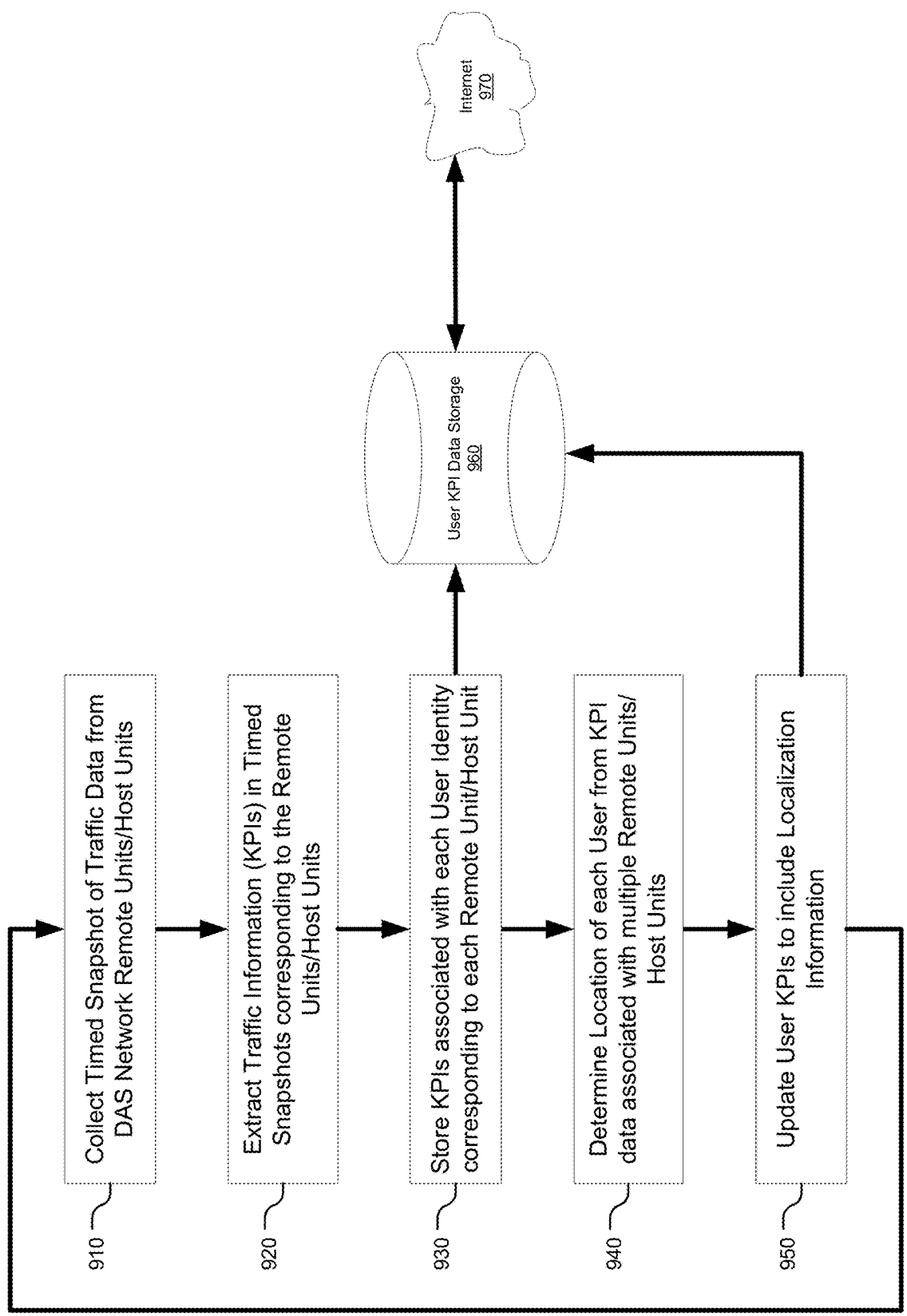
FIG. 9 illustrates an example of a process for obtaining KPIs for users on a DAS network.

FIG. 9 illustrates an example of a process for obtaining KPIs for users on a DAS network. The illustrated steps may be executed by a dedicated component in the DAS network, such as the KPI monitor unit described above. The KPI monitor unit may comprise a server computer. Alternatively or additionally, the steps may be executed individually by the DAUs and/or DRUs in the DAS network. Alternatively or additionally, the steps may be executed by one DAU or DRU that collects data from the other DAUs and/or DRUs. Alternatively or additionally, multiple DAUs and DRUs may operate cooperatively to collect and collate the KPI data.

At step 910, time-synchronized snapshots of traffic data may be collected from each remote unit (e.g., DRUs) and each host unit (e.g., DAUs). Timestamps indicate the time at which the snapshot was taken. A block of traffic data may be collected for each user presently associated with the DAS network. The snapshots may further be transported to a server for post-processing.

At step 920, the server may extract KPIs—that is, information about the user traffic data—from control channels associated with signals from the various network operators on the DAS network. At step 930, the KPIs collected at step 910 may be transmitted to a User KPI Data Storage 960 to be stored.

At step 940, the server may analyze time-synchronized snapshots from multiple remote units and/or host units and apply a triangulation method to determine a user's position. At step 950, the user's KPI data that is stored in the User KPI Data Storage 960 may be updated with the user's location information. The User KPI Data Storage 960 may be connected to the Internet 970, such that the user's KPI data and/or location may be available for example on the World Wide Web.

FIG. 10 illustrates an example of KPI data 1010 that may be collected and stored for each user, as well as an example of the organization of that data 1010. In the illustrated example, KPI data 1010 may be first organized by user. Each user associated with the DAS network may be provided with a unique identifier (ID). For example, in this illustrated example, a first user has been assigned ID #1123 and a second user has been assigned ID #1345. KPI data 1010 may further be organized according to the point at which the data 1010 was collected. As noted above, KPI data 1010 may have been collected at a remote unit or a host unit. Each remote unit and host unit in the DAS network may be assigned a unique identifier. For example, in the illustrated example, various remote units and host units have been assigned the IDs #35, #44, and #54. At each of these remote units and host units, data may be collected for each user. Thus, for example, the data for the user ID #1123 may include a block of data for each of the remote/host IDs #35, #44, and #54. Similarly, the user ID #1345 may include a block of data for the remote/host ID #35, as well as the remote/host IDs #44 and #54 (not shown). A block of KPI data may further include, for example, a transmission timestamp, whether it is uplink or downlink data, a number of resource blocks, a bitmap of the resource blocks, a modulation scheme, an acknowledgment, a User Equipment (UE) channel, a Base Station (BS) channel, a signal-to-noise ratio (SNR), and/or a signal-to-interference-plus-noise ratio (SINR).

Figure 11:
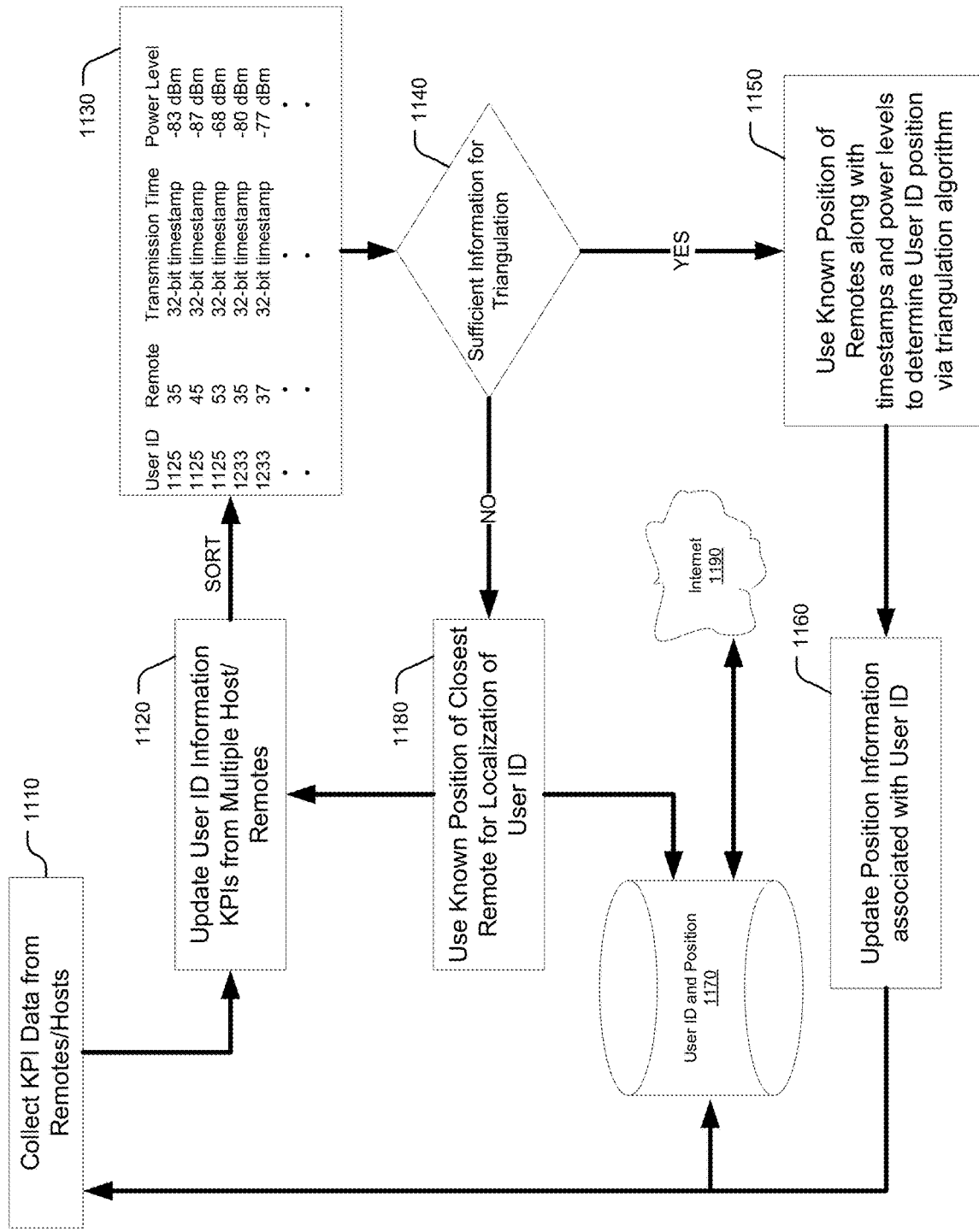
FIG. 11 illustrates an example of a process for determining a user's position using KPI data.

FIG. 11 illustrates an example of a process for determining a user's position using KPI data. This example process may be executed by a dedicated component in the DAS network, such as, for example, a KPI monitor unit and/or a User KPI Data and Position storage component and/or a server connected to the DAS network. Alternatively or additionally, the steps may be executed by a DAU or DRU in the DAS network. Alternatively or additionally, the steps may be executed by multiple DAUs and/or DRUs working cooperatively.

At step 1110, KPI data may be collected from remote units and/or host units. At step 1120, the user's stored information may be updated with the most recent KPI data collected at step 110. The user's information may have changed since the last snapshots were taken and stored; for example, the user may have moved out of the range of one group of remote units and into the range of another group of remote units. In many cases, KPI data is collected for the user from multiple remote units and/or host units. At step 1120, the user's stored information may be updated for some or all of the multiple remote units and/or host units.

At step 1130, user KPI data may be sorted according to the way in which the data may be analyzed. For example, the KPI data may first be sorted by user, then by the location of the remote unit and/or host unit where the data was collected, or by a transmission time of the data, or by the power level of the received signal, or by some other metric or by some combination of metrics.

At step 1140, the illustrated process may determine whether sufficient KPI data has been collected to perform triangulation, and determine a user's location. When an insufficient amount of data has been collected, the process may proceed to step 1180. At step 1180, the user's position may be determined from the position of the remote unit that was closest to the user. Whether a remote unit was closest to a user may be determined, for example, by finding the remote unit that received the user's signal at the highest power level. The remote unit's location may be known, for example, because the remote unit's location was stored at the time the remote unit was installed. Once the user's position has been estimated from the nearest remote unit to that user, the user's position may be stored at step 1170. The user's information may also be updated at step 1120 with this estimated position.

When, at step 1140, the illustrated process determines that sufficient KPI data has been collected to perform triangulation, the process proceeds to step 1150. At step 1150, the process may apply a triangulation method, using the timestamps and power levels from the user's KPI data, and the position of the remote units. For example, the process may, at step 150, determine which remote units received both the strongest and most recent signal from a user. The location of these remote units may be known, for example, because the location of the remote units was stored when the remote units were installed. The process may triangulate on the user's location using the location of these remote units.

Having determined a position for a user, the process may, at step 1160, update the user's position information. This information may be stored at step 1170. The process may thereafter return to step 1110 and repeat. Repeating the process may provide updated information, as the user's information (including position) changes.

Figure 12:
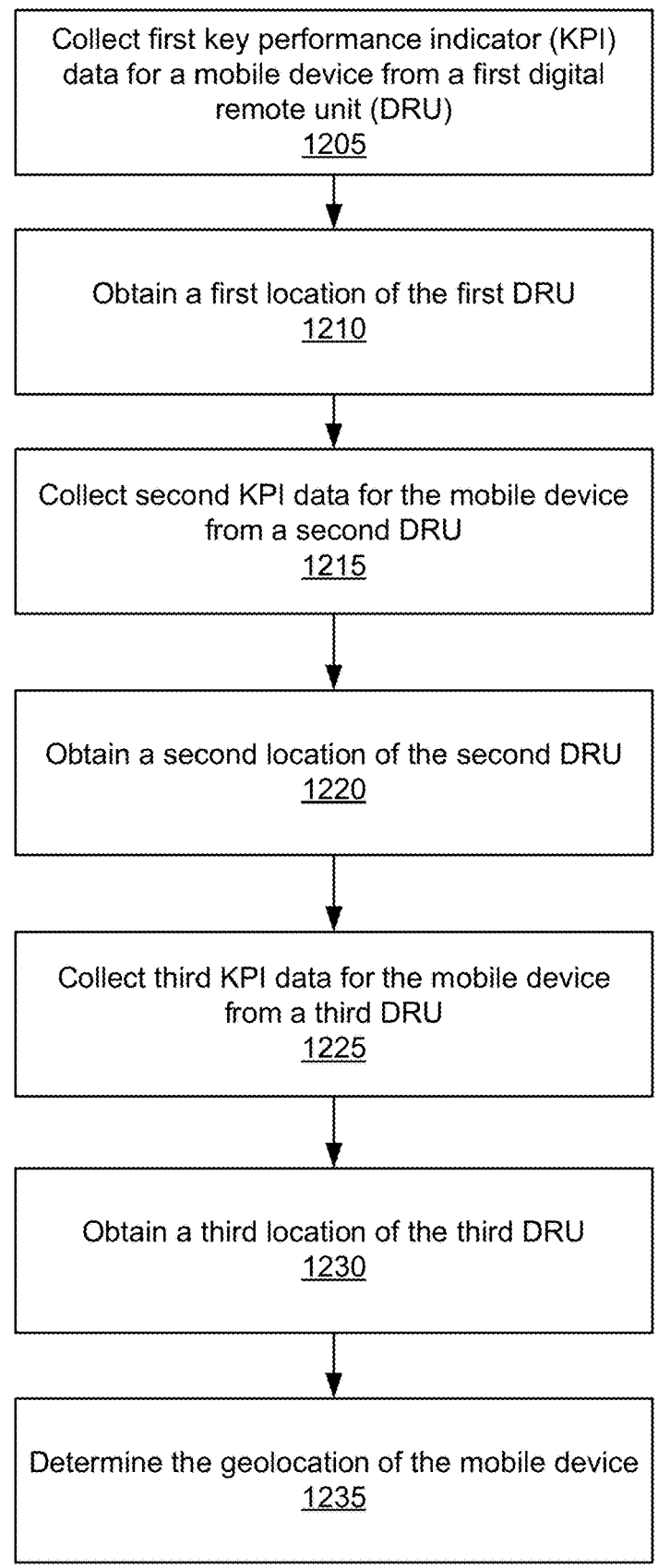
FIG. 12 illustrates an example of a process for determining a geolocation of a mobile device in a DAS network.

FIG. 12 illustrates an example of a flowchart of a method for determining a geolocation of a mobile device in a DAS network. At step 1205, first KPI data for the mobile device is collected from a first DRU. The first KPI data may be extracted from control channel information, such as that provided by the PDCCH for uplink or the PUCCH for downlink. The first KPI data comprises at least one of a first power level and a first transmission time (e.g., represented by a 32-bit timestamp). For example, the first power level may be −83 dBm. The mobile device may be associated with an identifier (e.g., 1125). The identifier may be different than the phone number associated with the mobile device, which may be encrypted during transmission.

At step 1210, a first location of the first DRU is obtained. The first DRU may be identified by a code, such as "35". The code may be used to obtain the location of the first DRU such as, for example, from a database. The location of the first DRU may have been stored when the first DRU was installed, for example.

At step 1215, second KPI data for the mobile device is collected from a second DRU. The second KPI data may be extracted from control channel information, such as that provided by the PDCCH for uplink or the PUCCH for downlink. The second KPI data comprises at least one of a second power level and a second transmission time (e.g., represented by a 32-bit timestamp). For example, the second power level may be −87 dBm. The mobile device may be identified by the same identifier used by the first DRU.

At step 1220, the second location of the second DRU is obtained. The second DRU may be identified by a code, such as "45". The code may be used to obtain the location of the second DRU such as, for example, from a database. The location of the second DRU may have been stored when the second DRU was installed, for example.

At step 1225, third KPI data for the mobile device is collected from a third DRU. The third KPI data may be extracted from control channel information, such as that provided by the PDCCH for uplink or the PUCCH for downlink. The third KPI data comprises at least one of a third power level and a third transmission time (e.g., represented by a 32-bit timestamp). For example, the third power level may be −68 dBm. The mobile device may be identified by the same identifier used by the first DRU and the second DRU.

At step 1230, the third location of the third DRU is obtained. The third DRU may be identified by a code, such as "53". The code may be used to obtain the location of the third DRU such as, for example, from a database. The location of the third DRU may have been stored when the third DRU was installed, for example.

At step 1235, the geolocation of the mobile device is determined using the first location and at least one of the first power level and the first transmission time, the second location and at least one of the second power level and the second transmission time, and the third location and at least one of the third power level and the third transmission time. For example, a triangulation algorithm may be applied using the first location and at least one of the first power level and the first transmission time, the second location and at least one of the second power level and the second transmission time, and the third location and at least one of the third power level and the third transmission time to determine the geolocation of the mobile device. As used herein, "at least one of [a] power level and [a] transmission time" is intended to mean the power level and/or the transmission time. In another embodiment, the geolocation of the mobile device may be estimated from the location of the DRU having the strongest power level.

In one embodiment, the geolocation of the mobile device and the identifier of the mobile device may be transmitted to an emergency responder system (e.g., E911) or database. The emergency responder system may maintain or have access to a mapping between phone numbers and mobile device identifiers, such that the mobile device identifier can be used to tie a geolocation to a particular phone number of a mobile device. Thus, the geolocation of the mobile device may be used to determine the location of an emergency caller, for example.

FIGS. 13-17 illustrate examples of Long Term Evolution (LTE) control channels from which user KPI data may be extracted. Although shown and described with respect to LTE, it is contemplated that embodiments of the invention may similarly extract user KPI data from control channels for other standards of wireless communication, such as 3G, 4G, GSM, etc.

Figure 13:
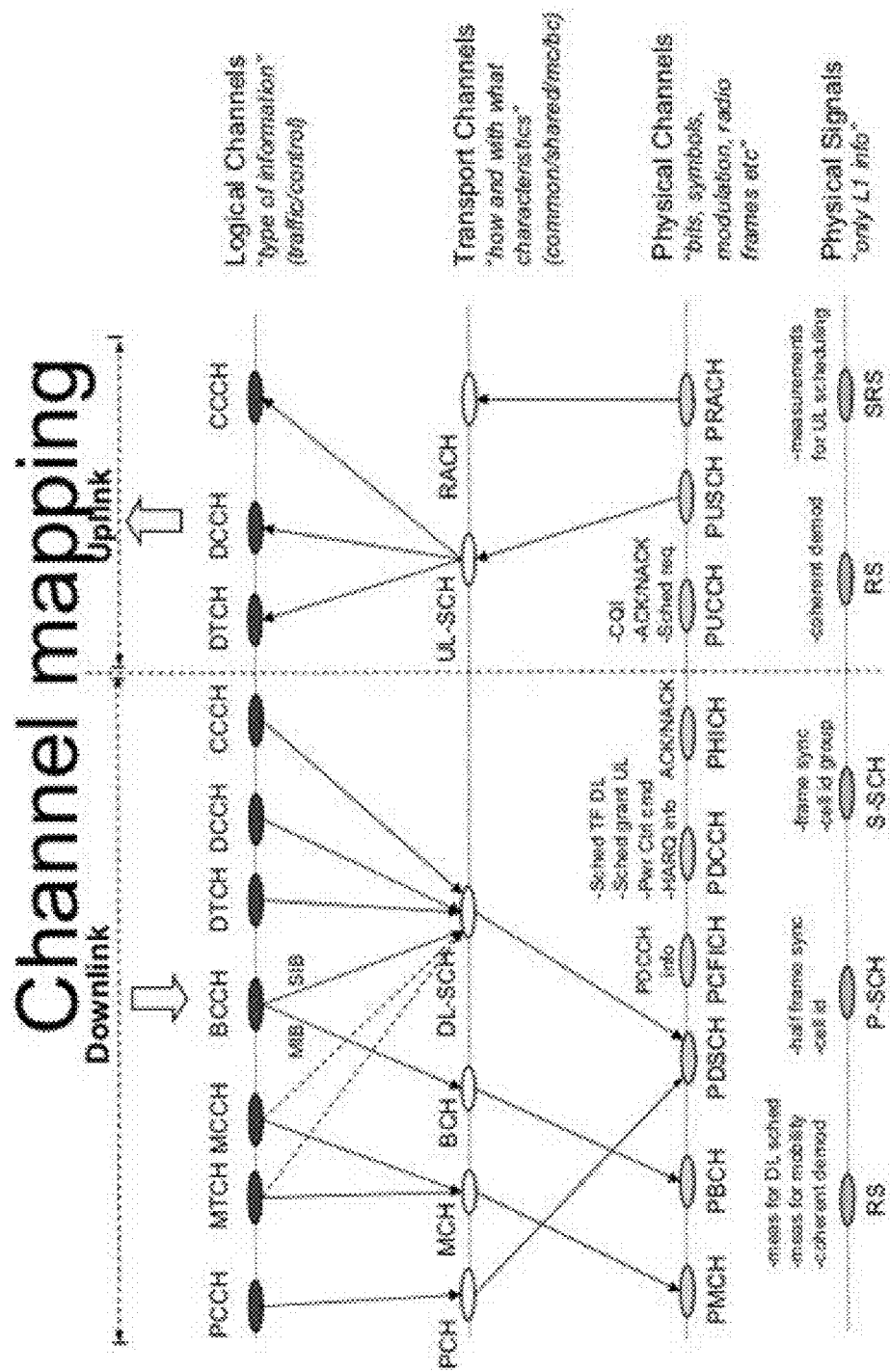
FIG. 13 illustrates an example of the Long Term Evolution (LTE) channels.
Figure 14:
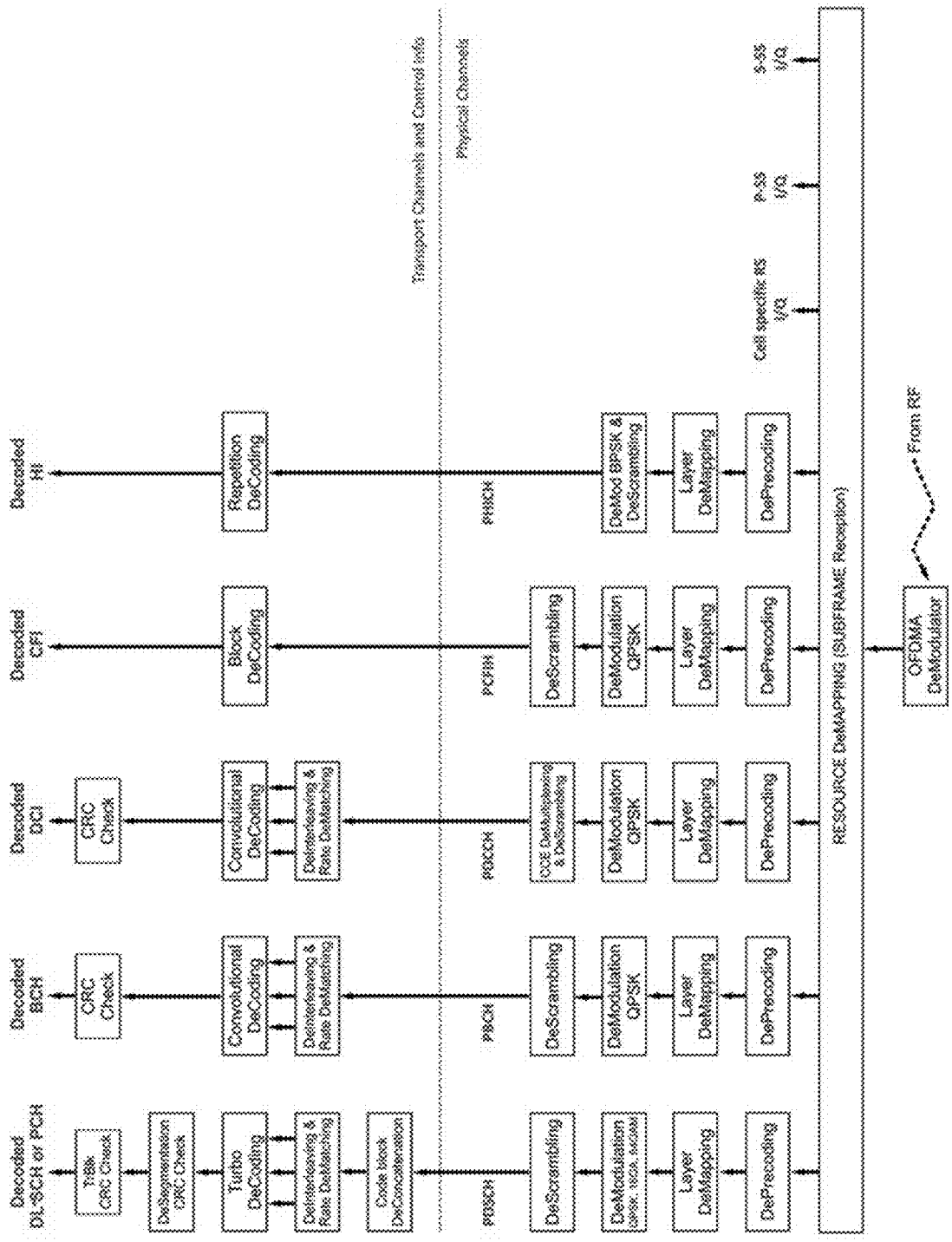
FIG. 14 illustrates an example of the LTE downlink receiver transport channels and control information.
Figure 15:
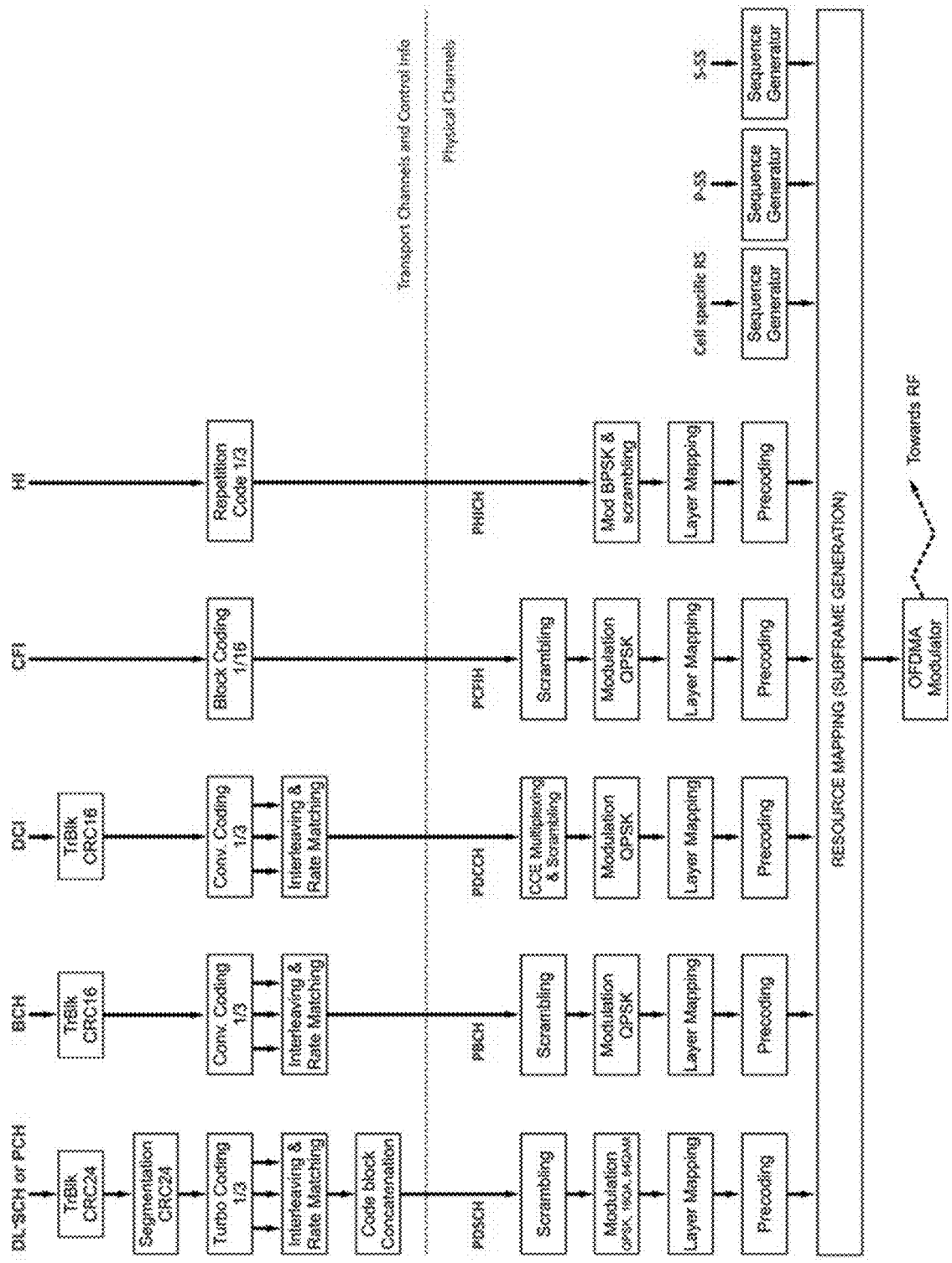
FIG. 15 illustrates an example of the LTE downlink transmitter transport channels and control information.
Figure 16:
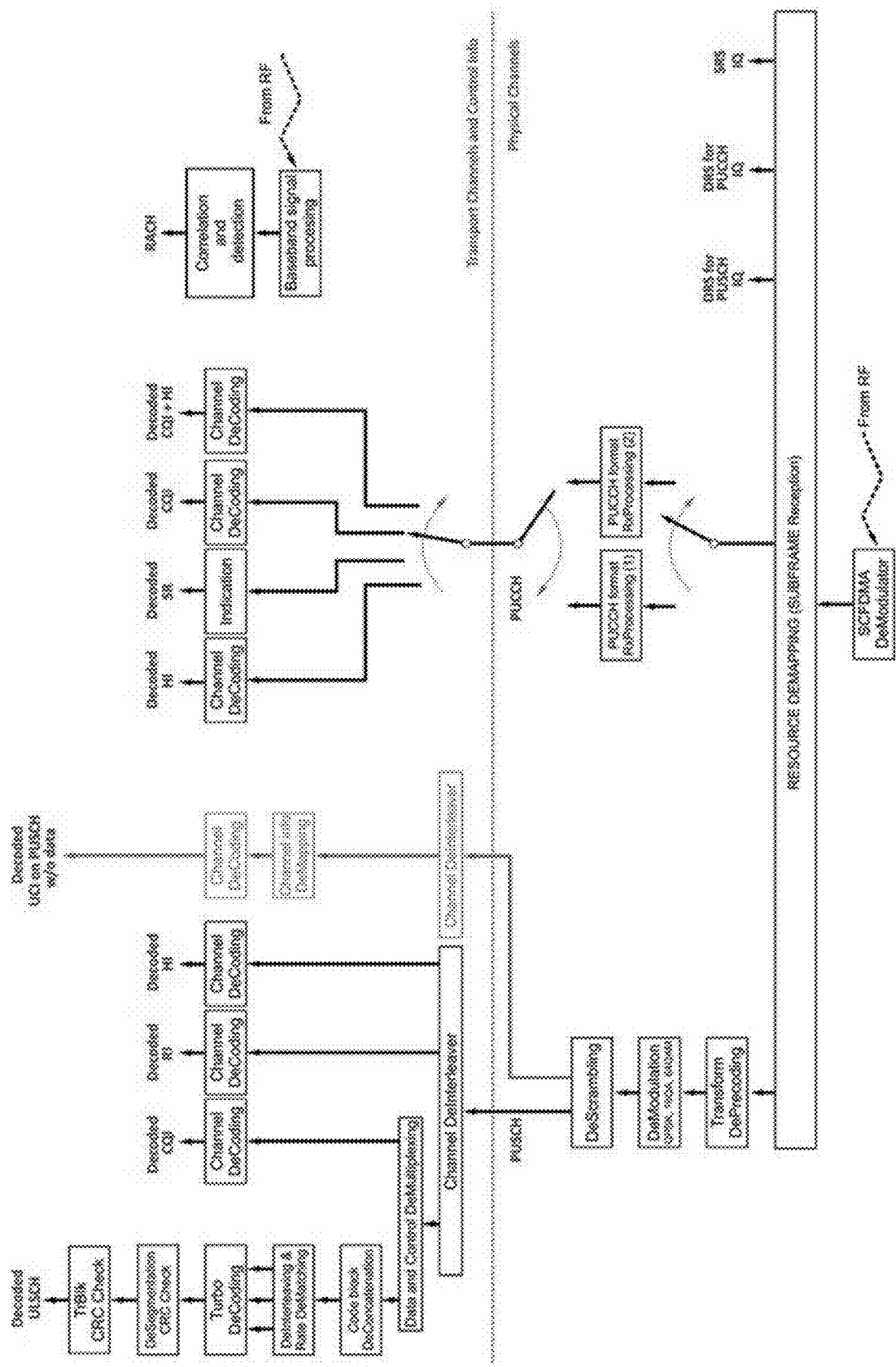
FIG. 16 illustrates an example of the LTE uplink receiver transport channels and control information.
Figure 17:
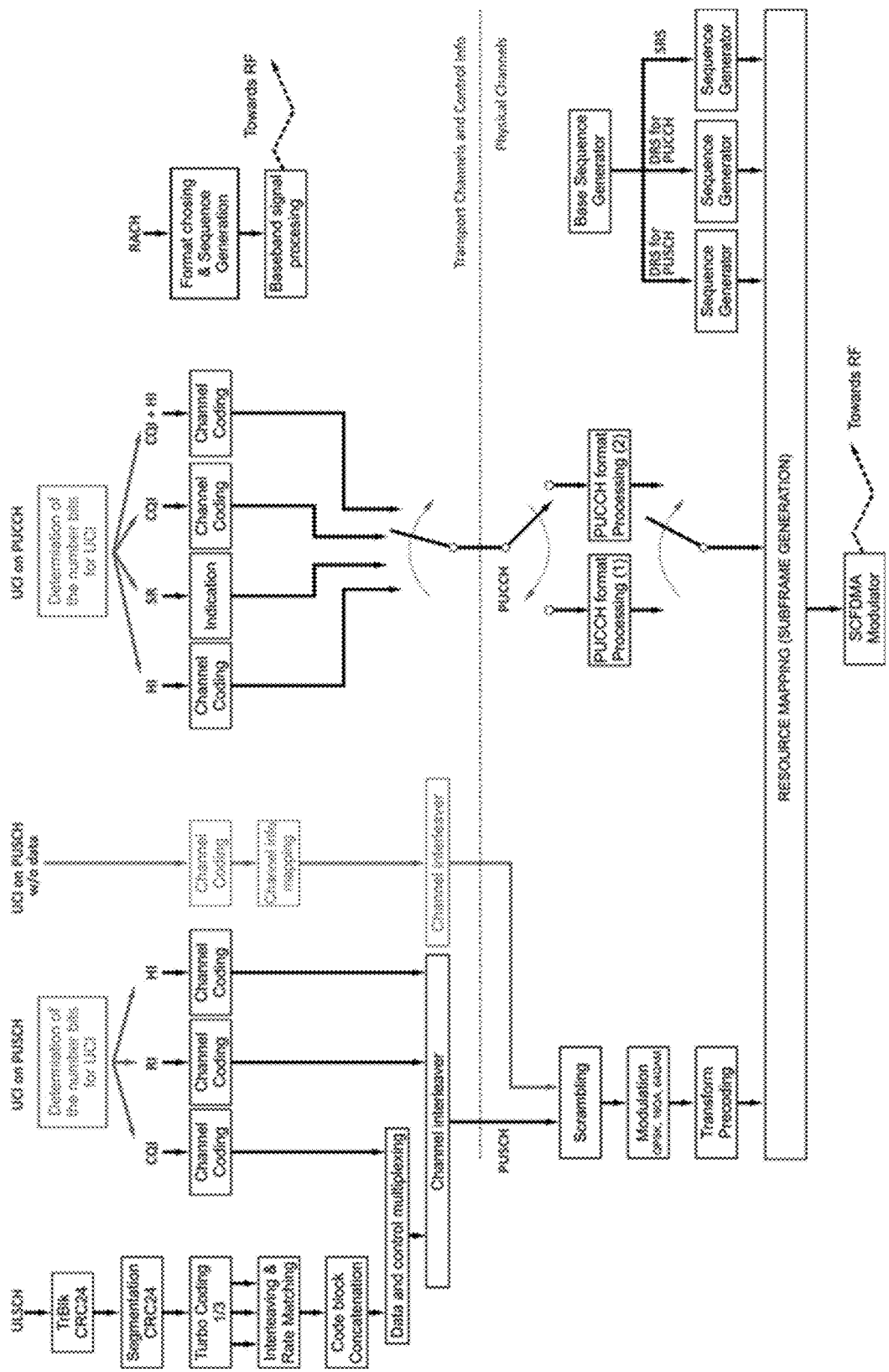
FIG. 17 illustrates an example of the LTE uplink transmitter transport channels and control information.

FIG. 13 illustrates an example of the LTE channels. User KPI data may be extracted primarily from the PDCCH on the downlink path and the PUCCH on the uplink path. The PDCCH channel is illustrated further in FIG. 14, which illustrates an example of the LTE downlink receiver transport channels and control information, and FIG. 15, which illustrates an example of the LTE downlink transmitter transport channels and control information. The PUCCH channel is illustrated further in FIG. 16, which illustrates an example of the LTE uplink receiver transport channels and control information, and FIG. 17, which illustrates an example of the LTE uplink transmitter transport channels and control information.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A Distributed Antenna System (DAS) comprising:
   a first digital remote unit (DRU) in communication with a mobile device, the first DRU including a first antenna;
   a second DRU in communication with the mobile device, the second DRU including a second antenna;
   a third DRU in communication with the mobile device, the third DRU including a third antenna;
   a digital access unit (DAU) configured to route signals to and from the first DRU, the second DRU, and the third DRU via optical connections; and
   a server computer communicatively coupled to the DAU, the server computer comprising:
   a processor; and
   a memory coupled to the processor, the memory storing instructions, executable by the processor, to perform:
   collecting, at each DRU, a timed snapshot of traffic data, the timed snapshot including a block of traffic data and a timestamp indicating a time at which the timed snapshot was taken;
   collecting, from the DAU, a first key performance indicator (KPI) data for the mobile device relative to the first DRU, wherein the first KPI data comprises at least one of a first power level or a first transmission time and the first KPI data is extracted from control channel information in the timed snapshot,
   obtaining, from the DAU, a first location of the first DRU,
   collecting, from the DAU, a second KPI data for the mobile device relative to the second DRU, wherein the second KPI data comprises at least one of a second power level or a second transmission time and the second KPI data is extracted from control channel information in the timed snapshot,
   obtaining, from the DAU, a second location of the second DRU, collecting, from the DAU, a third KPI data for the mobile device relative to the third DRU, wherein the third KPI data comprises at least one of a third power level or a third transmission time and the third KPI data is extracted from control channel information in the timed snapshot, obtaining, from the DAU, a third location of the third DRU, and determining a geolocation of the mobile device using the first location and at least one of the first power level or the first transmission time, the second location and at least one of the second power level or the second transmission time, and the third location and at least one of the third power level or the third transmission time.

2. The system of claim 1, wherein the instructions further comprise:

obtaining an identifier associated with the mobile device; and transmitting the identifier and the geolocation to an emergency responder system.

3. The system of claim 1, wherein the first KPI data, the second KPI data and the third KPI data are collected from at least one control channel including one or more of a PDCCH for uplink or a PUCCH for downlink.

4. The system of claim 1, wherein the geolocation of the mobile device is determined using a triangulation algorithm.

5. The system of claim 1, further comprising:
at least one base transceiver station (BTS) coupled to the DAU.

6. The system of claim 1, wherein the first DRU, the second DRU and the third DRU are coupled to a DAU of a plurality of DAUs in a star configuration.

7. The system of claim 1, wherein the first DRU, the second DRU and the third DRU are coupled to a DAU of a plurality of DAUs in a loop.

8. The system of claim 1, wherein the first DRU, the second DRU and the third DRU are connected to each other in a daisy chain configuration.

9. The system of claim 1, further comprising:
at least one digital expansion unit (DEU) coupled to the first DRU, the second DRU, and the third DRU, wherein at least one DAU is coupled to the at least one DEU.

10. The system of claim 1, wherein the DAU is configured to capture a time-synchronized snapshot relative to one or more of the first, second, and third DRUs, the time-synchronized snapshot comprising at least one of a user identification number, DRU identification number and, a transmission timestamp.

11. The system of claim 1, wherein:
the first KPI data comprises the first transmission time;
the second KPI data comprises the second transmission time; and
the third KPI data comprises the third transmission time.

12. The system of claim 1, wherein the geolocation of the mobile device is determined using at least one of a time delay of arrival technique and a time difference of arrival technique.

13. The method of claim 1, wherein the geolocation of the mobile device is determined using at least one of a time delay of arrival technique and a time difference of arrival technique.

14. A method for determining a geolocation of a mobile device in a Distributed Antenna System (DAS), the method comprising:

collecting, at each Digital Remote Unit (DRU), a timed snapshot of traffic data, the timed snapshot including a block of traffic data and a timestamp indicating a time at which the timed snapshot was taken;

collecting, from a digital access unit (DAU), a first key performance indicator (KPI) data for the mobile device relative to a first digital remote unit (DRU), wherein the first DRU includes a first antenna and is in communication with the DAU via a first optical connection, and wherein the first KPI data comprises at least one of a first power level or a first transmission time and the first KPI data is extracted from control channel information in the timed snapshot;

obtaining, from the DAU, a first location of the first DRU;

collecting, from the DAU, a second KPI data for the mobile device relative to a second DRU, wherein the second DRU includes a second antenna and is in communication with the DAU via a second optical connection, and wherein the second KPI data comprises at least one of a second power level or a second transmission time and the second KPI data is extracted from control channel information in the timed snapshot;

obtaining, from the DAU, a second location of the second DRU;

collecting, from the DAU, a third KPI data for the mobile device relative to a third DRU, wherein the third DRU includes a third antenna and is in communication with the DAU via a third optical connection, and wherein the third KPI data comprises at least one of a third power level or a third transmission time and the third KPI data is extracted from control channel information in the timed snapshot;

obtaining, from the DAU, a third location of the third DRU; and determining the geolocation of the mobile device using the first location and at least one of the first power level or the first transmission time, the second location and at least one of the second power level or the second transmission time, and the third location and at least one of the third power level or the third transmission time.

15. The method of claim 14, further comprising:
obtaining an identifier associated with the mobile device; and transmitting the identifier and the geolocation to an emergency responder system.

16. The method of claim 14, wherein the first KPI data, the second KPI data and the third KPI data are collected from at least one control channel including one or more of a PDCCH for uplink or a PUCCH for downlink.

17. The method of claim 14, wherein the geolocation of the mobile device is determined using a triangulation algorithm.

18. The method of claim 14, wherein the DAU is coupled to at least one base transceiver station (BTS).

19. The method of claim 14, wherein the first DRU, the second DRU and the third DRU are coupled to the DAU in a star configuration.

20. The method of claim 14, wherein the first DRU, the second DRU and the third DRU are coupled to the DAU in a loop.

21. The method of claim 14, wherein the first DRU, the second DRU and the third DRU are connected to each other in a daisy chain configuration.

22. The method of claim 14, wherein the first DRU, the second DRU and the third DRU are coupled to at least one digital expansion unit (DEU), and wherein the at least one DEU is coupled to the DAU.

23. The method of claim 14, wherein:
 the first KPI data comprises the first transmission time;
 the second KPI data comprises the second transmission time; and
 the third KPI data comprises the third transmission time.

\* \* \* \* \*

UNITED STATES PATENT AND TRADEMARK OFFICE
CERTIFICATE OF CORRECTION

PATENT NO. : 11,026,077 B2
APPLICATION NO. : 15/203015
DATED : June 1, 2021
INVENTOR(S) : Stapleton Page 1 of 1

It is certified that error appears in the above-identified patent and that said Letters Patent is hereby corrected as shown below:

On the Title Page

Item (71) Applicant:
Please delete "Dali Systems Co. Ltd., Grand Cayman (KY)" and insert --Dali Systems Co. Ltd., George Town, Grand Cayman (KY)--;

Item (73) Assignee:
Please delete "DALI SYSTEMS CO. LTD., George Town (KY)" and insert --DALI SYSTEMS CO. LTD., George Town, Grand Cayman (KY)--.

Signed and Sealed this
Ninth Day of August, 2022

Katherine Kelly Vidal
*Director of the United States Patent and Trademark Office*